United States Patent
Jackson

(10) Patent No.: US 11,766,060 B2
(45) Date of Patent: Sep. 26, 2023

(54) COMPOSITIONS COMPRISING MOGROSIDES, STEVIOL GLYCOSIDES AND GLYCOSYLATED DERIVATIVES THEREOF AND METHODS OF ENHANCING THE MOUTHFEEL OR SWEETNESS OF CONSUMABLES

(71) Applicant: Sweet Green Fields, LLC, Bellingham, WA (US)

(72) Inventor: Mel Clinton Jackson, Honolulu, HI (US)

(73) Assignee: SWEET GREEN FIELDS USA LLC, Bellingham, WA (US)

( * ) Notice: Subject to any disclaimer, the term of this patent is extended or adjusted under 35 U.S.C. 154(b) by 321 days.

(21) Appl. No.: 16/872,644

(22) Filed: May 12, 2020

(65) Prior Publication Data
US 2020/0268028 A1 Aug. 27, 2020

Related U.S. Application Data

(63) Continuation of application No. 15/797,904, filed on Oct. 30, 2017, now abandoned.

(60) Provisional application No. 62/577,776, filed on Oct. 27, 2017, provisional application No. 62/416,356, filed on Nov. 2, 2016.

(51) Int. Cl.
*A23L 27/30* (2016.01)

(52) U.S. Cl.
CPC ............ *A23L 27/36* (2016.08); *A23L 27/31* (2016.08); *A23V 2002/00* (2013.01)

(58) Field of Classification Search
CPC ................................ A23L 27/36; A23L 27/31
See application file for complete search history.

(56) References Cited

U.S. PATENT DOCUMENTS

| | | | |
|---|---|---|---|
| 8,257,948 B1 | 9/2012 | Markosyan | |
| 9,044,038 B2 * | 6/2015 | Yoshinaka | ............. A23L 21/15 |
| 2008/0300402 A1 | 12/2008 | Yang et al. | |
| 2012/0214751 A1 | 8/2012 | Markosyan | |
| 2013/0316043 A1 | 11/2013 | Purkyastha | |
| 2014/0017378 A1 | 1/2014 | Purkayastha et al. | |
| 2014/0199246 A1 | 7/2014 | Purksayastha | |
| 2014/0227421 A1 | 8/2014 | Markosyan | |
| 2016/0192684 A1 | 7/2016 | Chaturvedula | |
| 2016/0198749 A1 | 7/2016 | Fletcher et al. | |

FOREIGN PATENT DOCUMENTS

JP 2003-252895 A 9/2003

OTHER PUBLICATIONS

Yoshikawa, S., Murata, Y., Sugiura, M., Kiso, T., Shizuma, M., Kitahata, S., Nakano, H. 2005. "Transglycosylationof Mogroside V, a Triterpene Glycoside in Siraitia grosvenori, by Cyclodextrin Glucanotransferase and Improvement of the Qualities of Sweetness." J. Appl. Glycosci. vol. 52, pp. 247-252.
International Search Report. PCT/US17/59158, dated Jan. 11, 2018.
File History of U.S. Appl. No. 15/797,904, filed Oct. 30, 2017.
U.S. Appl. No. 15/797,904, filed Oct. 30, 2017, Pending.
Supplementary Partial European Search Report, EP 17 86 6853, dated Jul. 28, 2020.
International Preliminary Report on Patentability and Written Opinion. PCT/US17/59158, dated Jan. 11, 2018.

* cited by examiner

*Primary Examiner* — Nikki H. Dees
(74) *Attorney, Agent, or Firm* — Michael Ye; Rimon Law

(57) ABSTRACT

The invention describes compositions comprising glycosylated mogroside(s) or glycosylated swingle extracts and methods of enhancing the mouthfeel, sweetness or flavor of consumable products.

20 Claims, 5 Drawing Sheets

COMPOSITIONS COMPRISING MOGROSIDES, STEVIOL GLYCOSIDES AND GLYCOSYLATED DERIVATIVES THEREOF AND METHODS OF ENHANCING THE MOUTHFEEL OR SWEETNESS OF CONSUMABLES

This application is a continuation of U.S. application Ser. No. 15/797,904, filed Oct. 30, 2017, which claims priority to U.S. Provisional Application No. 62/577,776, filed Oct. 27, 2017, U.S. Provisional Application No. 62/416,356, filed Nov. 2, 2016, the contents of which are incorporated herein by reference in their entirety.

FIELD

The invention relates generally to compositions comprising glycosylated mogroside(s) or glycosylated swingle extracts and methods of enhancing the mouthfeel, sweetness or flavor of consumable products.

BACKGROUND OF THE INVENTION

Mogrosides are a family of triterpene glycosides isolated from fruits of *Siraitia grosvenorii* (Swingle), also known as *Momordica grosvenori* (Swingle), Luo Han Guo or monk fruit etc. Extracts of the fruits, i.e., Swingle extracts, are commercially used as natural sweeteners. Four major compounds, Mogroside V, Mogroside IV, Siamenoside I, and 11-Oxomogroside V, have been identified from the fruits of *Siraitia grosvenorii* (Swingle) that are responsible for the sweetness of the fruits. Mogrosi de V (abbreviated as "MGV" herein), is a mogrol glycoside containing five sugar residues per molecule. The chemical structure of MGV is represented by formula (I) as shown below. In recent years, various extraction and purification methods have been developed which are capable of providing Luo Han Guo fruit extracts having a relatively high content of mogroside V. Such extracts are now being marketed as non-caloric natural sweeteners in some countries.

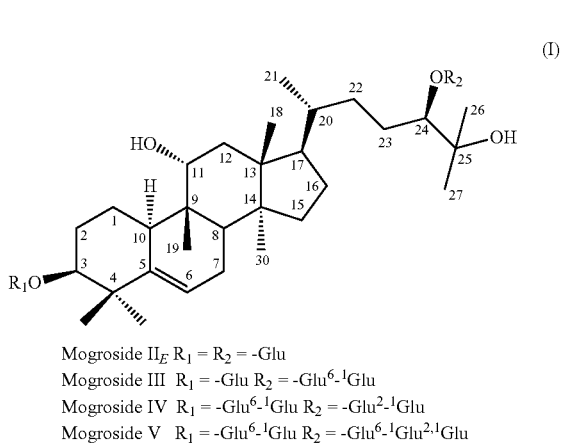

Mogroside II$_E$ R$_1$ = R$_2$ = -Glu
Mogroside III R$_1$ = -Glu R$_2$ = -Glu$^6$-$^1$Glu
Mogroside IV R$_1$ = -Glu$^6$-$^1$Glu R$_2$ = -Glu$^2$-$^1$Glu
Mogroside V R$_1$ = -Glu$^6$-$^1$Glu R$_2$ = -Glu$^6$-$^1$Glu$^{2,1}$Glu Stevia extracts generally contain a high percentage of the glycosides of the diterpene steviol. For example, the leaves of *Stevia rebaudiana* contain over 10 different steviol glycosides (abbreviated as "SG" herein). Steviol glycosides (SGs), whose structures are represented by formula (II) and Table 1 as noted below, are considered high intensity and non-caloric natural sweeteners (about 250-300 times that of sucrose) and have been used for several years in a number of countries as sweeteners for a range of food products (consumables). Stevioside and rebaudioside A are the principal sweetening compounds and are generally accompanied by smaller amounts of other steviol glycosides. The taste quality of rebaudioside A is better than stevioside, because of increased sweetness and decreased bitterness (Phytochemistry 68, 2007, 1855-1863).

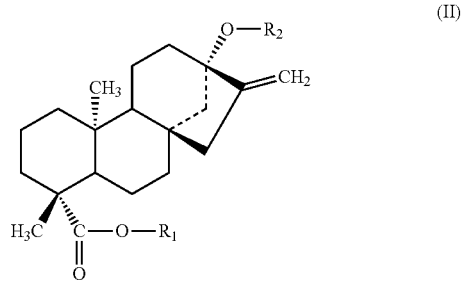

TABLE 1

| | Compound name | C.A.S. No. | R$_1$ | R$_2$ |
|---|---|---|---|---|
| 1 | Steviol | 471-80-7 | H | H |
| 2 | Steviolbioside | 41093-60-1 | H | β-Glc-β-Glc(2→1) |
| 3 | Stevioside | 57817-89-7 | β-Glc | β-Glc-β-Glc(2→1) |
| 4 | Rebaudioside A | 58543-16-1 | β-Glc | β-Glc-β-Glc(2→1) <br> \| <br> β-Glc(3→1) |
| 5 | Rebaudioside B | 58543-17-2 | H | β-Glc-β-Glc(2→1) <br> \| <br> β-Glc(3→1) |
| 6 | Rebaudioside C | 63550-99-2 | β-Glc | β-Glc-β-Rha(2→1) <br> \| <br> β-Glc(3→1) |
| 7 | Rebaudioside D | 63279-13-0 | β-Glc-β-Glc(2→1) | β-Glc-β-Glc(2→1) <br> \| <br> β-Glc(3→1) |

TABLE 1-continued

| | Compound name | C.A.S. No. | R$_1$ | R$_2$ |
|---|---|---|---|---|
| 8 | Rebaudioside E | 63279-14-1 | β-Glc-β-Glc(2→1) | β-Glc-β-Glc(2→1) |
| 9 | Rebaudioside F | 438045-89-7 | β-Glc | β-Glc-β-Xyl(2→1)<br>\|<br>β-Glc(3→1) |
| 10 | Rubusoside | 63849-39-4 | β-Glc | β-Glc |
| 11 | Dulcoside A | 64432-06-0 | β-Glc | β-Glc-α-Rha(2→1) |
| 12 | Rebaudioside M<br>(also known as<br>Rebaudioside X) | 1220616-44-3 | (β-Glc)$_2$-β-glc- | (β-Glc)$_2$-β-glc- |

However, the taste and temporal profiles of swingle extracts and stevia extracts may not be ideal For example, the mogroside V and steviol glycosides, such as rebaudioside A and rebaudioside B etc., have a certain off-flavors, or bitterness, metallic taste, a lingering aftertaste, a licorice taste or delayed onset of sweetness.

Therefore, a need exists for substances, methods to prepare the substances and compositions that incorporate the substances that overcome one or more of the current disadvantages noted above.

BRIEF SUMMARY OF THE INVENTION

The present invention surprisingly provides useful compositions that have sweetness and good mouthfeel without one or more of off-flavor, bitterness, metallic taste, lingering aftertaste, a licorice taste or delayed onset of sweetness.

The compositions include single components or mixtures of mogroside(s) ("MGs"), steviol glycosides ("SGs"), glycosylated mogrosides ("GMGs"), and glycosylated steviol glycosides ("GSGs"), in combination with each other and optionally in combination with sugar.

Suitable compositions include the components (constituents) or mixtures of a GMG. In second embodiment, the GMG can be in combination with sugar. In a third embodiment, a composition is provided where GMG can be combined with a GSG. In a fourth embodiment, a composition is provided where GMG and an SG composition are combined. In a fifth embodiment, a composition of GMG and a MG composition is provided. In a sixth embodiment, a composition of GMG, a GSG and sugar is provided. In a seventh embodiment, a composition of GMG, an SG and sugar is presented. An eighth embodiment includes a composition of a. GMG, an MG and sugar. A ninth embodiment includes a composition of a GMG, a GSG and an SG. A tenth embodiment includes a composition of a GMG, a GSG and an MG. In an eleventh embodiment, a composition of a GMG, an SG and an MG is presented. In a twelfth embodiment, a composition of a GMG, a GSG, an SG and an MG is provided. A thirteenth embodiment provides a composition of a GMG, a GSG an SG and sugar. A fourteenth embodiment provides a composition of a GMG, a GSG, an MG and sugar. A fifteenth embodiment provides a composition of an MG, an SG, a GMG and a sweetener, such as sugar. A sixteenth embodiment provides a composition of a GMG, a GSG an SG, an MG and sugar. A seventeenth embodiment provides a composition of an MG and a GSG. An eighteenth embodiment provides a composition of an MG, a GSG and an SG. A nineteenth embodiment provides a composition of an MG, a GSG and sugar. A twentieth embodiment provides a composition of an MG, a GSG, an SG and sugar.

In certain aspects, the constituents noted above or combinations can be considered sweeteners. In other aspects, where the concentration of the constituent or combinations described herein is below the threshold for detection of sweetness the constituent or combination, then the constituent or the combination described herein can be considered a flavoring. The flavoring can still help to mask the undesired attributes of individual constituents of an MG, an SG or a GSG.

It should be understood that the terms "MG", "SG", "GSG" and "GMG" as used above include not just the combination of various components of an MG extract but also each component in isolation from the other components. For example, SGs include, for example, one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside rebaudioside I, rebaudioside L, rebaudioside N, rebaudioside K, rebaudioside J, rubusoside and dulcoside A. MGs include, for example, mogroside II, mogroside III, mogroside IV, mogroside V, siamenoside I, and 11-oxomogroside V.

Therefore, one or more of the constituents of an extract from mogroside (MGs) or stevia (SGs), or glycosylated products of MGs or SGs (GMGs) or (GSGs) can be excluded from the others advantageously to produce a desired taste profile. Alternatively, one or more of the individual constituents of an extract from MGs, SGs, or the glycosylated products, GMGs or GSGs can be utilized in the absence of other constituents to active at a desired sweetness, taste profile or mouthfeel.

A surprising advantage and effect of the GMGs described herein, either as a glycosylated mixture of GMGs from a swingle extract or other mogroside source such as monk fruit, or as isolated GMG constituents, e.g., a single GMG such as glycosylated GMG-V, is the ability of the GMG(s) to reduce or eliminate bitterness, aftertaste, metallic taste, undesired lingering aftertaste, licorice taste or delayed onset of sweetness associated with SG(s), MG(s) and/or GSG(s). That is, addition of a GMG(s) to any of stevia components, such as steviol, stevioside, steviolbioside, rebaudioside A (RA), rebaudioside B (RB), rebaudioside C (RC), rebaudioside D (RD), rebaudioside E (RE), rebaudioside F (RF), rebaudioside M (RM), rebaudioside O (RO), rebaudioside H (RH), rebaudioside I (RI), rebaudioside L (RL), rebaudioside N (RN), rebaudioside K (RK), rebaudioside J (RJ), rubusoside and dulcoside A or mixtures thereof, results in the reduction or eliminate of the unwanted tastes associated with the SG constituents. This masking effect of GMGs is also applicable to MGs as well as GSGs. MGs often have unwanted materials which remain from the extract from which the MG is isolated. Likewise, unwanted remaining SGs present from the extracts from which the GSGs were prepared, can be masked by the use of one or GMG(s). Furthermore, the GMGs described herein can enhance the mouthfeel of solutions or compositions.

The various constituents and combinations can be included with various sweeteners including, but not limited to, sucrose, fructose, glucose, high fructose corn syrup, xylose, arabinose, rhamnose and sugar alcohols. Additionally, one or more artificial sweeteners can be used in combination with the combinations described herein and include aspartame, sucralose, neotame, acesulfame potassium, saccharin and combinations thereof.

The various embodiments disclosed herein can be incorporated into consumables, including but not limited to a food product, a flavoring, a pharmaceutical composition, a dietary supplement, a nutraceutical, a dental hygienic composition, a tabletop sweetener etc.

Food products include, but are not limited to, cereal products, rice products, tapioca. products, sago products, baker's products, biscuit products, pastry products, bread products, confectionery products, desert products, gums, chewing gums, chocolates, ices, honey products, treacle products, yeast products, baking-powder, salt and spice products, savory products, mustard products, vinegar products, sauces (condiments), tobacco products, cigars, cigarettes, processed foods, cooked fruits and vegetable products, meat and meat products, jellies, jams, fruit sauces, egg products, milk and dairy products, yogurts, cheese products, butter and butter substitute products, milk substitute products, soy products, edible oils and fat products, medicaments, beverages, carbonated beverages, alcoholic drinks, beers, soft drinks, mineral and aerated waters and other non-alcoholic drinks, fruit drinks, fruit juices, coffee, artificial coffee, tea, cocoa, including forms requiring reconstitution, food extracts, plant extracts, meat extracts, condiments, sweeteners, nutraceuticals, gelatins, pharmaceutical and non-pharmaceutical gums, tablets, lozenges, drops, emulsions, elixirs, syrups and other preparations for making beverages, and combinations thereof.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

Figure 1:
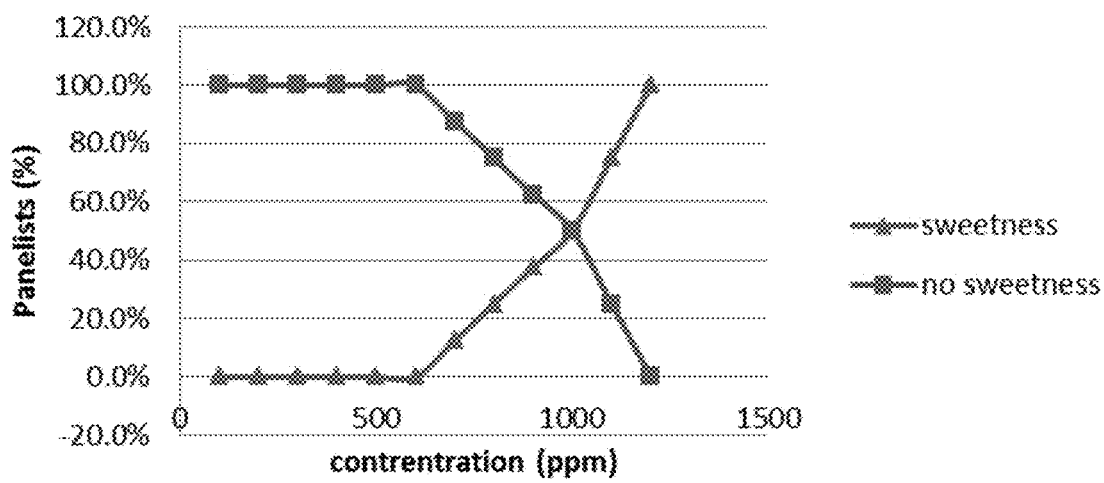
FIG. 1 is an evaluation curve of the sweetness detection threshold of GMG-V20L.

In the specification and in the claims, the terms "including" and "comprising" are open-ended terms and should be interpreted to mean "including, but not limited to . . . " These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Definitions/Terminology

The phrases "MG compositions", "GMG composition(s)", "GSG compositions", and "SG compositions" as used herein is intended to mean a combination of at least one MG, GMG, GSG and/or SG (or individual constituents thereof) with at least one other component, such as a MG, GMG, GSG, SG, and/or a sweetener for example. The phrase is also intended to include multiple GMGs, GSGs, MGs and/or multiple steviol glycosides (SGs). Further, the compositions can further include additional additives described throughout the specification.

The term "sweetener(s)" is intended to include materials (other than the MGs, SGs, GMGs and GSGs described herein) that impart sweetness to a composition, such as cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin (a sweet tasting protein), erythritol, trehalose, raffinose, cellobiose, tagatose, DOLCIA PRIMA™ all lose inulin, N-[N-[3-(3-hydroxy-4-methoxyphenyl)propyl]-alpha-aspartyl]-L-phenylalanine 1-methyl ester, glycyrrhizin, sodium cyclamate, and mixtures thereof.

Other sweet tasting proteins besides thaumatin that are sweeteners, or also referred to as sweetener enhancers, include for example, brazzein, miraculin, curculin, pentadin, mabinlin, etc.

In other aspects the compositions further include one or more salts, such as sodium carbonate, sodium bicarbonate, sodium chloride, potassium chloride, magnesium chloride, sodium sulfate, magnesium sulfate, and potassium sulfate, or any edible salt. The compositions can also further include cyclodextrin.

Extracts from the fruits of *Siraitia grosvenorii* (Swingle), also known as *Momordica grosvenori* (Swingle), Luo Han Guo or monk fruit etc. provide a family of triterpene-glycosides and are referred to as mogroside(s) ("MGs") throughout the specification. The extracts include, for example, mogroside V, mogroside IV, siamenoside I, and 11-oxomogroside V. Constituents of the mogroside extracts are referred to by the designation "MG" followed by symbol, such as "V", therefore mogroside V is "MGV". Siamenoside I would be "SST", 11-oxomogroside V would be "OGV".

The phrase "mogroside' is a tri terpene-glycoside and is recognized in the art and is intended to include the major and minor constituents of mogroside extracts.

It should be understood that monk fruit extracts can contain, for example, a mogroside such as MGV, in an amount of 20% by weight, 40% by weight, 50% by weight, 60% by weight or higher but containing other mogrosides or non-mogrosides in the extracts. For example, other components include other mogrosides such as mogroside II, mogroside $III_A$, mogroside $III_E$, mogroside $IV_A$, mogroside $IV_E$, siamenoside I, and 11-oxomogroside V. In addition, some other polysaccharides or flavonoids may be present.

The mogroside(s) of interest can be purified before use.

Extracts from stevia plants provide steviol glycosides ("SGs") with varying percentages of components, SGs. The phrase "steviol glycoside" is recognized in the art and is intended to include the major and minor constituents of stevia. These "SGs" include, for example, steviol, stevioside, steviolbioside, rebaudioside A (RA), rebaudioside B (RB), rebaudioside C (RC), rebaudioside D (RD), rebaudioside E (RE), rebaudioside F (RF), rebaudioside M (RM), rebaudioside O (RO), rebaudioside H (RH), rebaudioside I (RI), rebaudioside L (RL), rebaudioside N (RN), rebaudioside K (RK), rebaudioside J (RJ), rubusoside and dulcoside A (DA).

A "steviol glycoside" (SG) as referred to herein, pertains to a material that includes a steviol glycoside found in the stevia plant, such as rebaudioside A (RA), rebaudioside B (RB), rebaudioside D (RD), stevioside, etc. and the mixtures thereof. The steviol glycoside of interest can be purified before use.

For example, the acronym "RAxx" as used herein denotes a purity of Rebaudioside A (RA) final product isolated from crude extract of Stevia, where "xx" is a number between 01 and 99 (or higher) and is the percentage of Rebaudioside A in the dried product. More generally, acronyms of the type "YYxx" are used herein to denote the purity of a given ingredient denoted by the placeholder "YY", as a mass percentage of a compound, where "xx" is a number between 01 and 99 (or higher) and is the percentage of product YY in the product. For instance, a compound that is 95% steviol glycosides ("SG") would be denoted by "SG95", and a compound that is 97% stevioside ("STV") would be denoted by "STV97". A product of that is 97% rebaudioside A would be denoted by "RA97". Denoted percentages for RA ranged from 90 to 99.5 include a margin of plus or minus 0.5% point (any from 90% to 99.5%), unless otherwise indicated. Denoted percentages for RA ranged from 70 to less than 90 include a margin of plus or minus 0.5% point (any from 70% to less than 90%), unless otherwise indicated. Denoted percentages for RA ranged from 20 to less than 70 include a margin of plus or minus 0.5% point (any from 20% to less than 70%), unless otherwise indicated. For instance, "99% or higher purity Reb A" would include purity between 98.5% Reb A and RA99.5, whereas "RA97" would include a range of 96.5% to 97.5%. "RA99+" means greater than 99.0% purity Reb A. "Pure Reb A" is denoted as RA99.5, and is defined in U.S. Patent Application Publication No. 2006/0083838.

A "glycosylated mogroside(s)" (GMG, CMGs), refers to a mogroside that is glycosylated at least at one or more positions in addition to those positions glycosylated in native form, obtained, for example, by synthetic manipulation or by enzymatic processes.

The terms "glycosylated mogroside", or "glycosylated swingle extract containing a glycosylated mogroside" refers to compounds obtained by transglycosylating swingle extract containing mogrosides, or transglycosylating purified mogrosides so as to add glucose units, for example, one, two, three, four, five or more than five glucose units, to the native mogrosides by glycosyltransferase, preferably. CGTase enzyme (cyclodextringlycosyltransferase). Herein, the glycosylated mogroside(s), or the glycosylated swingle extract containing glycosylated mogroside(s), comprises short chain compounds obtained by hydrolyzation of glycosylated product and also comprises non-glycosylated ingredients which are the residue of non-reacted mogrosides, or unreacted components other than mogrosides contained in the swingle extract.

A suitable procedure to prepare glycosylated mogrosides (GMGs) or glycosylated swingle extract(s) includes i) dissolving dextrin in water (eg., reverse osmosis), ii) adding the mogrosides or extract to the solubilized dextrin to obtain a mixture, wherein the ratio of dextrin to mogrosides/extract is optimized in a ratio of between 40:60 and 60:40, iii) adding CGTase enzyme to the mixture followed by incubating the mixture at 60° C. for a desired length of reaction time to glycosylate mogrosides with glucose molecules derived from dextrin.

After achieving the desired ratio of GMG(s) and residual mogroside(s) contents, the reaction mixture is heated to 90-100° C. for 30 minutes to inactivate the CGTase, which is then removed by filtration.

Optionally, amylase can be added to the mixture and the mixture is incubated at 70° C. for a desired length of reaction time to shorten the length of glucose chain(s) in the GMG molecules.

Decolorization and/or spray drying the resulting mixture of GMG, residual mogrosides and dextrin can then be undertaken.

It should be understood that GMG(s) essentially contains glycosylated mogroside(s), but also contains unreacted mogrosides, dextrin and other non-mogroside substances found in extracts. It should also be understood that the GMG(s) can be purified and/or separated into purified/isolated components.

A "glycosylated steviol glycoside(s)" (GSG, GSGs) as referred to herein, pertains to a steviol glycoside that is glycosylated at multiple positions (including partially glycosylated steviol glycosides) obtained, for example, by synthetic manipulation or by enzymatic processes, such as GSG-RA50. It should be understood that GSG(s) essentially contains a glycosylated steviol glycoside(s), but also contains unreacted steviol glycosides, dextrin and other non-steviol glycoside substances found in extracts. It should also be understood that the GSG(s) can be purified and/or separated into purified/isolated components.

The term "glycosylated steviol glycosides" (GSGs) refers to compounds obtained by enzymatic processes, for example, by transglycosylating stevia extract containing steviol glycosides, or by common known synthetic manipulation. Herein, the G-SGs comprise glycosylated stevia extract containing glycosylated steviol glycoside(s) and also comprises short chain compounds obtained by hydrolyzation of glycosylated product, as well as non-glycosylated components which are the residue of unreacted steviol glycosides, or unreacted components other than steviol glycosides contained in the stevia extract. The methods and GSGs found in KR10-2008-0085811 are herein incorporated by reference.

The abbreviation "GX" is noted throughout the specification and refers to glycosyl groups "G" where "X" is a value from 1 to 20 and refers to the number of glycosyl groups present in the molecule. For example, Stevioside G1 (ST-G1) has one (1) glycosyl group (G), thus "G1", Stevioside G2 (ST-G2) has two (2) glycosyl groups present, Stevioside G3 (ST-G3) has three (3) glycosyl groups present, Stevioside G4 (ST-G4) has four (4) glycosyl groups present, Stevioside G5 (ST-G5) has five (5) glycosyl groups present, Stevioside G6 (ST-G6) has six (6) glycosyl groups present, Stevioside G7 (ST-G7) has seven (7) groups present, Stevioside G8 (ST-G8) has eight (8) glycosyl groups present, Stevioside G9 (ST-G9) has nine (9) glycosyl groups present, etc. The glycosylation of the molecule can be determined by HPLC-MS.

The phrase "sucrose equivalence" or "SE" is the amount of non-sucrose sweetener required to provide the sweetness of a given percentage of sucrose in the same food, beverage, or solution. For instance, a non-diet soft drink typically contains 12 grams of sucrose per 100 ml of water, i.e., 12% sucrose. This means that to be commercially accepted, diet soft drinks must have the same sweetness as a 12% sucrose soft drink, i.e., a diet soft drink must have a 12% SE. Soft drink dispensing equipment assumes an SE of 12%, since such equipment is set up for use with sucrose-based syrups.

The phrase "taste profile" is defined as the temporal profile of all basic tastes of a sweetener. The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness". A plurality of such human tasters is called a "sensory panel". In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness".

The term "mouthfeel" involves the physical and chemical interaction of a consumable in the mouth. Herein, specifically, the term "mouthfeel" refers to the fullness sensation experienced in the mouth, which relates to the body and texture of the consumable such as its viscosity.

The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness". A plurality of such human tasters is called a "sensory panel". In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness".

The phrase "sweetness detection threshold" refers to the minimum concentration at which panelists consisting of 8 persons are able to detect sweetness in a composition, liquid or solid. This is further defined as provided in the Examples herein.

Threshold of sweetness refers to a concentration of a material that below a concentration where sweetness can be detected may still impart a flavor to the consumable (including water). When half of a trained panel of testers determines something is "sweet" at a given concentration, then the sample meets the threshold. When less than half of a panel of testers cannot discern sweetness at a given concentration, then concentrations of the substance below the sweetness level are considered a flavoring.

The term "flavor" or "flavor characteristic", as used herein, is the combined sensory perception of the components of taste, odor, and/or texture. The term "enhance", as used herein, includes augmenting, intensifying, accentuating, magnifying, and potentiating the sensory perception of a flavor characteristic without changing the nature or quality thereof. The term "modify", as used herein, includes altering, varying, suppressing, depressing, fortifying and supplementing the sensory perception of a flavor characteristic where the quality or duration of such characteristic was deficient.

Components of the Compositions

In one embodiment, glycosylated steviol glycosides (GSGs) can be obtained for example, by synthetic manipulation or by enzymatic processes. The GSGs Obtained by these methods are not naturally occurring steviol glycosides. The methods and GSGs found in KR10-2008-0085811 are herein incorporated by reference. Stevioside GI (ST-G1), Stevioside G2 (ST-G2), Stevioside (33 (ST-G3), Stevioside G4 (ST-G4), Stevioside G5 (ST-G5), Stevioside G6 (ST-G6), Stevioside G7 (ST-G7), Stevioside (38 (ST-G8), Stevioside (39 (ST-G, Rebaudioside A G1 (RA-G1), Rebaudioside A G2 (RA-G2), Rebaudioside A G3 (RA-G3), Rebaudioside A G4 (RA-G4), Rebaudioside A G5 (RA-G5), Rebaudioside A G6 (RA-G6), Rebaudioside A G7 (RA-G7), Rebaudioside A G8 (RA-G8), Rebaudioside A G9 (A-G9), Rebaudioside B G1 (RB-G1), Rebaudioside B G2 (RB-G2), Rebaudioside B G3 (RB-G3), Rebaudioside B G4 (RB-G4), Rebaudioside B G5 (RB-G5), Rebaudioside B G6 (RB-G6), Rebaudioside B G7 (RB-G7), Rebaudioside B G8 (RB-G8), Rebaudioside B G9 (RB-G9), Rebaudioside C G1 (RC-G1), Rebaudioside C G2 (RC-G2), Rebaudioside C G3 (RC-G3), Rebaudioside C G4 (RC-G4), Rebaudioside C G5 (RC-G5), Rebaudioside C G6 (RC-C6), Rebaudioside C G7 (RC-G7), Rebaudioside C G8 (RC-G8), Rebaudioside C G9 (RC-G9), or any combination thereof can be incorporated into the sweetener compositions of the current invention. Alternatively in the current embodiments, the glycosylation process can be modified as to provide partially glycosylated steviol glycosides that can have further unique solubility and/or taste profiles.

A suitable method to prepare the glycosylated steviol glycosides (GSGs) can be found, for example, in KR10-2008-0085811 in Examples 1 and 2. It is also anticipated that other steviol glycosides, for example steviol, steviolbioside, rebaudioside B, rebaudioside C, rebaudioside D, rebaudioside E, rebaudioside F, rebaudioside M, rebaudioside O, rebaudioside H, rebaudioside rebaudioside L, rebaudioside N, rebaudioside K, rebaudioside J, rubusoside and dulcoside A can be enzymatically modified to afford their corresponding multiple glycosylated glycosides: Steviol G1, Steviol G2 Steviol (33, Steviol G4, Steviol G5, Steviol G6, Steviol G7, Steviol G8, Steviol G9, Steviobioside G1, Steviobioside G2, Steviobioside G3, Steviobioside G4, Steviobioside G5, Steviobioside G6, Steviobioside G7, Steviobioside G8, Steviobioside G9, Rebaudioside B G1, Rebaudioside B G2, Rebaudioside B G3, Rebaudioside B G4, Rebaudioside B G5, Rebaudioside B G6, Rebaudioside B G7, Rebaudioside B G8, Rebaudioside B G9, Rebaudioside C GI, Rebaudioside C G2, Rebaudioside C G3, Rebaudioside C G4, Rebaudioside C G5, Rebaudioside C G6. Rebaudioside C G7, Rebaudioside C G8, Rebaudioside C G9, Rebaudioside D G1, Rebaudioside D G2, Rebaudioside D G3, Rebaudioside D G4, Rebaudioside D G5, Rebaudioside D G6, Rebaudioside D G7, Rebaudioside D G8, Rebaudioside D G9, Rebaudioside D G1, Rebaudioside F G2, Rebaudioside E G3, Rebaudioside E G4, Rebaudioside E G5, Rebaudioside E G6, Rebaudioside E G7, Rebaudioside E G8, Rebaudioside E G9, Rebaudioside F G1, Rebaudioside F G2, Rebaudioside F G3, Rebaudioside F G4, Rebaudioside F G5, Rebaudioside F G6, Rebaudioside F G7, Rebaudioside F G8, Rebaudioside F G9, Rebaudioside M G1, Rebaudioside M G2, Rebaudioside M G3, Rebaudioside E G4, Rebaudioside M G5, Rebaudioside M G6, Rebaudioside M G7, Rebaudioside M G8, Rebaudioside M G9, Rubusoside G1, Rubusoside G2, Rubusoside C13, Rubusoside G4, Rubusoside G5, Rubusoside G6, Rubusoside G7, Rubusoside G8, Rubusoside G9, Dulcoside A G1, Dulcoside A G2, Dulcoside A G3, Dulcoside A G4, Dulcoside A G5, Dulcoside A G6, Dulcoside A G7, Dulcoside A G8, and Dulcoside A G9.

In a particular aspect, GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) are GSGs which are used to be combined with steviol glycosides, such as RA, RB, RD, etc. GSG-RA20 is typically prepared from RA20 as a key starting material, GSG-RA30 is typically prepared from RA30 as a key starting material, GSG-RA40 is typically prepared from RA40 as a key starting material, GSG-RA50 is typically prepared from RA50 as a key starting material, GSG-RA60 is typically prepared from RA60 as a key starting material, GSG-RA70 is typically prepared from RA70 as a key starting material, GSG-RA80 is prepared from RA.80 as the key starting material, GSG-RA90 is typically prepared from RA90 as a key starting material, GSG-RA95 is typically prepared from RA95 as a key starting material, and GSG-RA97 is prepared from RA97 as a key starting material. Since each composition contains varying concentrations of GSGs and steviol glycosides, then each composition may have different solubility and taste properties. It is envisioned that specific ratios of GSGs and steviol glycosides may have unique and beneficial physical and chemical properties that are unknown and have not been previously disclosed.

All of the components of the composition disclosed herein can be purchased or be made by processes known to those of ordinary skill in the art and combined (e.g., precipitation/co-precipitation, mixing, blending, grounding, mortar and pestle, microemulsion, solvothermal, sonochemical, etc.) or treated as defined by the current invention. Specifically, as examples, any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) can be combined with one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside 1, rebaudioside L, rebaudioside N, rebaudioside K, rebaudioside J, rubusoside and dulcoside A to provide sweetener compositions with improved solubility and/or improved sweetness. The content of GSG or GSGs from any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) mixed with the disclosed steviol glycosides such as the steviol glycosides found in the stevia plant or sweet tea extract can be from 1% wt/wt to 100% wt/wt. A GSG or GSGs, such as any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) can be included in the composition at 1% wt/wt, 2% wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example less than about 70 percentage by weight, less than about 50 percentage by weight, from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% \A/wt to about 40% wt/wt, from about 10% wt/wt to about 30% wt/wt, from about 10% wt/wt to about 20% wt/wt, from about 20 to less than about 50 percentage by weight, from about 30 to less than about 50 percentage by weight, from about 40 to less than about 50 percentage by weight, and from about 20 to 45 percentage by weight of the sweetening composition.

In another aspect, the one or more steviol glycosides (SG's) including steviol, stevioside, steviothioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, and dulcoside A are contained in the composition with improved solubility and/or sweetness. The steviol glycosides of the compositions can make up 1% wt/wt, 2% wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the sweetening composition.

In another aspect, the one or more mogrosides (MGs) are contained in the composition with improved solubility and/or sweetness. The MGs of the compositions can make up 1% wt/wt, 2% wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the sweetening composition.

In another aspect, the one or more glycosylated steviol icosides (GSGs) are contained in the composition with improved solubility and/or sweetness. The GSGs of the compositions can make up 1% wt/wt, 2% wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/w-t to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97 0 wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the sweetening composition.

In another aspect, the one or more glycosylated mogrosides (CMGs) are contained in the composition with improved solubility and/or sweetness. The CMGs of the compositions can make up 1% wt/wt, wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the sweetening composition.

In another aspect, the one or more sweeteners are contained in the composition with improved solubility and/or sweetness. The sweeteners of the compositions can make up 1% wt/wt, 2% wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the sweetening composition.

Additionally, the sweetener or alternatively the sweetner enhancer, can be present in the compositions described herein in a range of from about 0.5 ppm to about 10 ppm, from about 1 ppm to about 9 ppm, from about 2 ppm to about 8 ppm, from about 3 ppm to about 7 ppm from about 4 ppm to about 6 ppm, about 5 ppm, and all values and ranges encompassed over the range of from about 0.5 ppm to about 10 ppm.

Sugar, if present can be present in the compositions described herein in a range of from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 10 weight percent.

Other additives can be used in the compositions described herein to enhance flavor characteristics that are sweet, fruity, floral, herbaceous, spicy, aromatic, pungent, "nut-like" (e.g., almond, pecan), "spicy" (e.g., cinnamon, clove, nutmeg, anise and wintergreen), "non-citrus fruit" flavor (e.g., strawberry, cherry, apple, grape, currant, tomato, gooseberry and blackberry), "citrus fruit" flavor (e.g., orange, lemon and grapefruit), and other useful flavors, including coffee, cocoa, peppermint, spearmint, vanilla and maple.

The compositions noted herein can be used as a sugar substitute alone or in combination with a food product.

The compositions noted herein can be used in beverages, broths, and beverage preparations selected from the group comprising carbonated, non-carbonated, frozen, semi-frozen ("slush"), non-frozen, ready-to-drink, concentrated (powdered, frozen, or syrup), dairy, non-dairy, herbal, non-herbal, caffeinated, non-caffeinated, alcoholic, non-alcoholic, flavored, non-flavored, vegetable-based, fruit-based, root/tuber/corm-based, nut-based, other plant-based, cola-based, chocolate-based, meat-based, seafood-based, other animal-based, algae-based, calorie enhanced, calorie-reduced, and calorie-free products, optionally dispensed in open containers, cans, bottles or other packaging. Such beverages and beverage preparations can be in ready-to-drink, ready-to-cook, ready-to-mix, raw, or ingredient form and can use the composition as a sole sweetener or as a co-sweetener.

The compositions noted herein can be used in foods and food preparations (e.g., sweeteners, soups, sauces, flavorings, spices, oils, fats, and condiments) from dairy-based, cereal-based, baked, vegetable-based, fruit-based, root/tuber/corm-based, nut-based, other plant-based, egg-based, meat-based, seafood-based, other animal-based, algae-based, processed (e.g., spreads), preserved (e.g., meals-ready-to-eat rations), and synthesized (e.g., gels) products.

The compositions noted herein can be used in candies, confections, desserts, and snacks selected from the group comprising dairy-based, cereal-based, baked, vegetable-based, fruit-based, root/tuber/corm-based, nut-based, gum-based, other plant-based, egg-based, meat-based, seafood-based, other animal-based, algae-based, processed (e.g., spreads), preserved (e.g., meals-ready-to-eat rations), and synthesized (e.g., gels) products. Such candies, confections, desserts, and snacks can be in ready-to-eat, ready-to-cook, ready-to-mix, raw, or ingredient form, and can use the compositions as a sole sweetener or as a co-sweetener.

The GSG noted herein can be used in prescription and over-the-counter pharmaceuticals, assays, diagnostic kits, and therapies selected from the group comprising weight control, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g., toothpaste, mouthwash, rinses, floss, toothbrushes, other implements), personal care products (e.g., soaps, shampoos, rinses, lotions, balms, salves, ointments, paper goods, perfumes, lipstick, other cosmetics), professional dentistry products in which taste or smell is a factor (e.g., liquids, chewables, inhalables, injectables, salves, resins, rinses, pads, floss, implements), medical, veterinarian, and surgical products in which taste or smell is a factor (e.g., liquids, chewables, inhalables, injectables, salves, resins, rinses, pads, floss, implements), and pharmaceutical compounding fillers, syrups, capsules, gels, and coating products.

The compositions noted herein can be used in consumer goods packaging materials and containers selected from the group comprising plastic film, thermoset and thermoplastic resin, gum, foil, paper, bottle, box, ink, paint, adhesive, and packaging coating products.

The compositions noted herein can be used in goods including sweeteners, co-sweeteners, coated sweetener sticks, frozen confection sticks, medicine spoons (human and veterinary uses), dental instruments, presweetened disposable tableware and utensils, sachets, edible sachets, potpourris, edible potpourris, artificial flowers, edible artificial flowers, clothing, edible clothing, massage oils, and edible massage oils.

Without limitation, the components (MGs, SGs, GMGs and GSGs) described herein can each individually be in an amorphous form, each individually in a polymorphic form, each individually in a hydrate form, or mixtures thereof.

Various compositions can be prepared with the components discussed herein including MG(s), SG(s), GMG(s), GSG(s), and optionally, in combination a sweetener, such as sugar. Thus the following twenty embodiments are included as suitable compositions. It should be understood that the singular notations also include plural forms of the abbreviations, e.g., GMG includes GMGs.

(1) Mixtures of GMGs.
(2) A GMG in combination with a sweetener, e.g., sugar or a sweet tasting protein.
(3) A GMG in combination with a GSG.
(4) A GMG in combination with an SG.
(5) A GMG in combination with an MG.
(6) A GMG, a GSG and a sweetener, e.g., sugar or a sweet tasting protein.
(7) A GMG, an SG and a sweetener, e.g., sugar or a sweet tasting protein.
(8) A GMG, an MG and a sweetener, e.g., sugar or a sweet tasting protein.
(9) A GMG, a GSG and an SG.
(10) A GMG, a GSG and an MG.
(11) A GMG, an SG and an MG.
(12) A GMG, a GSG, an SG and an MG.
(13) A GMG, a GSG an SG and a sweetener, e.g., sugar or a sweet tasting protein.
(14) A GMG, a GSG, an MG and a sweetener, e.g., sugar or a sweet tasting protein.
(15) A GMG, a GSG an SG, an MG and a sweetener, e.g., sugar or a sweet tasting protein.
(16) An MG, an SG, a GSG and a sweetener, e.g., sugar or a sweet tasting protein.
(17) An MG and a GSG.
(18) An MG, a GSG and an SG.
(19) An MG, a GSG and a sweetener, e.g., sugar or a sweet tasting protein.
(20) An MG, a GSG, an SG and a sweetener, e.g., sugar or a sweet tasting protein.

In certain aspects, a sweet tasting protein is also referred to as a sweetener enhancer.

Methods to Prepare Materials

Sources of mogrosides and mogroside extracts include *Momordica grosvenori*. Other names include *Momordica grosvenori* fruit, Buddha fruit, Monordica fruit, luo han kuo, *Siraitia grosvenorii*, *Grosvener Siraitia*, arhat fruit, monk's fruit, luo han guo, longevity fruit, lohan kuo, luohanguo, la han qua (Vietnamese), rakanka. (Japan). The juice or extract of the fruit includes mainly non-sugar natural sweeteners, the triterpenoid glycosides, which include mogroside V (esgoside), mogroside IV, and D-mannitol. The natural sweetness of them is 256-344, 126, and 0.55-0.65 times of that of sugar. The juice/extract contains large amounts of glucose, 14% fructose, proteins, vitamin C, and 26 inorganic elements such as manganese, iron, nickel, selenium, tin, iodine, molybdenum and others. The juice/extract also includes fatty acids, such as linoleic acid, oleic acid, palmitic acid, stearic acid, palmitic acid, myristic acid, lauric acid, and decanoic acid.

A common process for obtaining a stevia extract is as follows.

Extract stevia leaves with water at 20-80° C. with the ratio of leaves to water being about 1:10 to 1:20 (w/v). The mixture can be clarified by flocculation or membrane filtration. The mixture can then be purified through a macroporous resin and ion exchange resin. The filtrate is then crystallized with a mixture of water/alcohol (ethanol or methanol) to obtain a precipitate which is then filtered and dried.

As used herein, a swingle extract or mogroside extract containing mogrosides is produced by the method of extracting the fruit of *Siraitia grosvenorii* (Swingle) with an alcohol, a mixture of alcohol and water, or water to obtain mixtures of mogrosides, then purified to provide desired mogrosides such as mogroside V. Specifically, a swingle extract containing mogrosides is produced by the method as follows: extraction of the fruit of *Siraitia grosvenorii* (Swingle) with an alcohol, a mixture of alcohol and water, or water to obtain the mogrosides (such as mogroside V etc.) component ranging from about 1% to 99% by weight of the extract. In a preferred embodiment, the swingle extract contains about 10-90% by weight mogrosides. In another preferred embodiment, the swingle extract contains about 20-80% by weight mogrosides. In another preferred embodiment, the swingle extract contains about 30-70% by weight mogrosides. In another preferred embodiment, the swingle extract contains about 40-60% by weight mogrosides.

A suitable process to obtain a mogroside extract (swingle extract) is provided as follows. Luo Han Ciuo fruit is extracted with water or a mixture of water/alcohol (ethanol or methanol) at a temperature of from about 40° C. to about 80° C. with the ratio of fruit to solvent being about 1:10 to about 1:20 (weight to volume). The liquid can be clarified by flocculation or membrane filtration followed by purification thorugh a macroporous resin and ion exchange resin. Decloratizatioin can be accomplished with activated carbon. Solids are then filtered and dried.

In one aspect as an example, glycosylated mogroside V (GMGV), is produced by dissolving dextrin in water (reverse osmosis water). The ratio of GMGV to water is about 1:10 (weight/volume, (w/v)). A swingle extract with a mogroside content of between 1% and 99% is added to dextrin solution. In one embodiment, the dextrin to swingle extract ratio was optimized to a ratio of between 30:70 and 70:30. CGTase enzyme is added to the mixture (ratio of GMGV to CGTase is about 20:1 (w/v) and incubated at 60-70° C. for a desired length of reaction time (typically from about 2 hours to about 72 hours, more preferably from about 8 hours to about 48 hours, even more preferably from about 12 hours to about 24 hours) to glycosylate mogrosides with glucose molecules derived from dextrin, wherein the addition amount by volume is about 0.1-0.5 ml based on 1 g mogrosides. (The ratio of GMGV to CGTase is from about 10:1 to about 20:1 w/v). After the desired ratio of GMGs and residual mogroside and dextrin contents are achieved (monitored by HPLC to analyze the content of unreacted MGV), the reaction mixture is heated to 80-100° C. for 30 min to inactivate the CGTase, which is then removed by filtration. The resulting solution of GMGs, residual mogroside and dextrin is decolored and spray dried.

HPLC conditions used were as follow:
Equipment: Shimadzu 20A
Column: Shiseido Capcell Pak C18 MG II S5 (5 μm, 4.6 mm×250 mm)
Detector: UV.
Wave length: 203 nm.
Flow rate: 1 ml/minute.
Concentration of sample: 2.0 mg/ml 60% methanol.
Mobile phase: water-acetonitrile 82:18 to 68:32 gradient for 45 minutes.

KR10-2008-0085811, incorporated herein by reference, discloses the preparation of glycosylated steviol glycosides, such as glycosylated rebaudiosi de A and rebaudioside B etc., obtained from enzymatic processes generally by treating a stevia extract with dextrin and a glycosyltransferase, preferably, CGTase enzyme (cyclodextringlycosyltransferase) in an aqueous environment.

A suitable method is as follows. Dextrin is dissolved in water (e.g., reverse osmosis water) to which a stevia extract with a total steviol glycoside content of about 70% to about 99% is added. CGTase enzyme is added to the mixture and the mixture is incubated for a desired period of time to glycosyl ate the steviol glycosides with glucose molecules from the tapioca dextrin. After a suitable ratio of GSG(s) and residual steviol glycoside content is achieved, the mixture is heated to about 90° C. to about 100° C. for about 30 minutes to inactivate the CGTase, which is then removed by filtration. The resultant solution can be decolorized and/or spray dried to provide a mixture of glycosylated steviol glycoside(s) (GSG(s)), residual steviol glycosides (SGs) and dextrin.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The following paragraphs enumerated consecutively from 1 through 151 provide for various aspects of the present invention. In one embodiment, in a first paragraph (1), the present invention provides:

1. A composition comprising a glycosylated mogroside or a glycosylated swingle extract and at least one non-mogroside based sweetener, a non-swingle based sweetener or a non-stevia based sweetener.

2. The composition according to paragraph 1, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin (a sweet tasting protein), brazzein, miraculin, curculin, pentadin, mabinlin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

3. The composition of either of paragraph 1 or 2, wherein the glycosylated mogrosi de or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

4. The composition of paragraph 3, wherein the glycosylated mogroside or the glycosylated swingle extract comprises glycosylated mogroside V.

5. The composition of paragraph 4, wherein the glycosylated mogroside V is GMG-V20L, GMG-V20S, GMG-V40, or GMG-V60.

6. The composition of any of paragraphs 1 through 5, wherein the ratio of the glycosylated mogroside or the glycosylated swingle extract to the non-mogroside sweetener is from 200:1 to about 1:2000 on a weight basis.

7. A composition comprising a glycosylated mogroside or a glycosylated swingle extract and a glycosylated steviol glycoside or a glycosylated stevia extract.

8. The composition of paragraph 7, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

9. The composition of paragraph 8, wherein the glycosylated mogroside or the glycosylated swingle extract comprises a glycosylated mogroside V.

10. The composition of paragraph 9, wherein the glycosylated mogroside V is GMG-V20L, GMG-V20S, GMG-V40, or GMG-V60.

11. The composition of any of paragraphs 7 through 10, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

12. The composition of paragraph 11, wherein the glycosylated product is a glycosylated rebaudioside A, a glycosylated rebaudioside B, a glycosylated rebaudioside D or combinations thereof.

13. The composition of any of paragraphs 7 through 12, wherein the ratio of the glycosylated mogroside or the glycosylated swingle extract to the glycosylated steviol glycoside or glycosylated stevia extract is from 3:1 to about 1:3 on a weight basis.

14. A composition of a glycosylated mogroside or a glycosylated swingle extract and a steviol glycoside or a stevia extract.

15. The composition of paragraph 14, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxotnogroside V or any combination thereof.

16. The composition of paragraph 15, wherein the glycosylated mogroside or the glycosylated swingle extract comprises a glycosylated mogroside V.

17. The composition of paragraph 16, wherein the glycosylated mogroside V is GMG-V20L, GMG-V20S, GMG-V40, or GMG-V60.

18. The composition of any of paragraphs 14 through 17, wherein the steviol glycoside or stevia extract comprises one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

19. The composition of paragraph 18, wherein the steviol glycoside is rebaudioside A, rebaudioside B, rebaudioside D or mixtures thereof.

20. The composition of paragraph 19, wherein the rebaudioside A is RA98.

21. The composition of any of paragraphs 14 through 20, wherein the ratio of the glycosylated mogroside or the glycosylated swingle extract to the steviol glycoside or stevia extract is from 1:1 to about 1:6 on a weight basis.

22. A composition comprising a glycosylated mogroside or a glycosylated swingle extract and a mogroside or a swingle extract.

23. The composition of paragraph 22, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

24. The composition of paragraph 23, wherein the glycosylated mogroside or the glycosylated swingle extract comprises a glycosylated mogroside V.

25. The composition of paragraph 24, wherein the glycosylated mogroside V is GMG-V20L, GAM-V20S, GAM-V40, or GMG-V60.

26. The composition of any of paragraphs 22 through 25, wherein the mogroside or swingle extract comprises mogroside II, mogroside III, mogroside IV, mogroside V, siamenoside I or 11-oxomogroside V or any combination thereof.

27. A composition comprising a glycosylated mogroside or a glycosylated swingle extract, a glycosylated steviol glycoside or a glycosylated stevia extract and at least one non-mogroside based sweetener, a non-swingle based sweetener or a non-stevia based sweetener.

28. The composition of paragraph 27, wherein the non-mogroside based sweetener, the non-swingle based sweetener or the non-stevia based sweetener comprises one or more of cane sugar, beet sugar, honey, sucrose, fructose, maltose, xvlitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PREVIA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

29. The composition of either of paragraph 27 or 28, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

30. The composition of paragraph 29, wherein the glycosylated mogroside or the glycosylated swingle extract comprises glycosylated mogroside V.

31. The composition of paragraph 30, wherein the glycosylated mogroside V is GMG-V20L, GMG-V20S, GMG-V40, or GMG-V60.

32. The composition of any of paragraphs 27 through 31, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside F, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

33. The composition of paragraph 32, wherein the glycosylated product is a glycosylated rebaudioside A, a glycosylated rebaudioside B, a glycosylated rebaudioside D or combinations thereof.

34. A composition comprising a glycosylated mogroside or a glycosylated swingle extract, a steviol glycoside and at least one non-mogroside based sweetener, a non-swingle based sweetener or a non-stevia based sweetener.

35. The composition of paragraph 34, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhatnnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOL- CIA PRIMA™ allulose, inulin, N-[N-[3-(3-hydroxy-4-methoxyphenyl)propyl]-alpha-aspartyl]-1,-phenylalanine 1-methyl ester, glycyrrhizin, monellin, or sodium cyclamate and mixtures thereof.

36. The composition of either of paragraph 34 or 35, wherein the glycosylated mogroside or the glycosylated swingle extract comprises a glycosylated mogroside II, a glycosylated mogroside a glycosylated mogroside IV, a glycosylated mogroside V, a glycosylated siamenoside I or a glycosylated 11-oxomogroside V or any combination thereof.

37. The composition of paragraph 36, wherein the glycosylated mogroside or the glycosylated swingle extract comprises glycosylated mogroside V.

38. The composition of paragraph 37, wherein the glycosylated mogroside V is GMG-V20L, GMG-V20S, GMG-V40, or GMG-V60.

39. The composition of any of paragraphs 34 through 38, wherein the steviol glycoside or stevia extract comprises one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

40. The composition of paragraph 39, wherein the steviol glycoside is rebaudioside rebaudioside B, rebaudioside D or mixtures thereof.

41. The composition of paragraph 40, wherein the rebaudioside A is RA98.

42. A composition comprising a glycosylated mogroside or a glycosylated swingle extract, a mogroside and at least one non-mogroside based sweetener, a non-swingle based sweetener or a non-stevia based sweetener.

43. The composition of paragraph 42, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin erythritol, trehalose, raffinose, cellobiose, tagatose, DOL-CIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

44. The composition of either of paragraph 42 or 43, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

45. The composition of paragraph 44, wherein the glycosylated mogroside or the glycosylated swingle extract comprises glycosylated mogroside V.

46. The composition of paragraph 45, wherein the glycosylated mogroside V is GMG-V20L, GMG-V20S, GMG-V40, or GMG-V60.

47. The composition of any of paragraphs 42 through 46, wherein the mogroside or swingle extract comprises mogroside II, mogroside III, mogroside IV, mogroside V, siamenoside I or 11-oxomogroside V or any combination thereof.

48. A composition comprising a glycosylated mogroside or a glycosylated swingle extract, a glycosylated steviol glycoside or a glycosylated stevia extract and a steviol glycoside.

49. The composition of paragraph 48, wherein the glycosylated mogroside or the glycosylated swingle extract comprises a glycosylated mogroside H, a glycosylated mogroside III a glycosylated mogroside IV, a glycosylated mogroside V, a glycosylated siamenoside I or a glycosylated 11-oxomogroside V or any combination thereof.

50. The composition of paragraph 49, wherein the glycosylated mogroside or the glycosylated swingle extract comprises glycosylated mogroside V.

51. The composition of paragraph 50, wherein the glycosylated mogroside V is GMG-V20L, GAM-V20S, GAM-V40, or GMG-V60.

52. The composition of any of paragraphs 48 through 51, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside rebaudioside I, rebaudioside L, rebaudioside N, rebaudioside K, rebaudioside J, rubusoside, dulcoside A and mixtures thereof.

53. The composition of paragraph 52, wherein the glycosylated product is a glycosylated rebaudioside A, a glycosylated rebaudioside B, a glycosylated rebaudioside D or combinations thereof.

54. The composition of any of paragraphs 48 through 54, wherein the steviol glycoside or stevia extract comprises one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside rebaudioside L, rebaudioside N, rebaudioside K, rebaudioside J, rubusoside, dulcoside A and mixtures thereof.

55. The composition of paragraph 54, wherein the steviol glycoside is rebaudioside A, rebaudioside B, rebaudioside I) or mixtures thereof.

56. The composition of paragraph 55, wherein the rebaudioside A is RA98.

57. A composition comprising a glycosylated mogroside or a glycosylated swingle extract, a glycosylated steviol glycoside or a glycosylated stevia extract and a mogroside.

58. The composition of paragraph 57, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

59. The composition of paragraph 58, wherein the glycosylated mogroside or the glycosylated swingle extract comprises glycosylated mogroside V.

60. The composition of paragraph 59, wherein the glycosylated mogroside V is GMG-V20L, GMG-V20S, GMG-V40, or GMG-V60.

61. The composition of any of paragraphs 57 through 60, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

62. The composition of paragraph 61, wherein the glycosylated product is a glycosylated rebaudioside A, a glycosylated rebaudioside B, a glycosylated rebaudioside D or combinations thereof.

63. The composition of any of paragraphs 57 through 62, wherein the mogroside or swingle extract comprises mogroside mogroside III, mogroside IV, mogroside V, siamenoside I or 11-oxomogroside V or any combination thereof.

64. A composition comprising a glycosylated mogroside or a glycosylated swingle extract, a steviol glycoside or a stevia extract and a mogroside or a swingle extract.

65. The composition of paragraph 64, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

66. The composition of paragraph 65, wherein the glycosylated mogroside or the glycosylated swingle extract comprises glycosylated mogroside V.

67. The composition of paragraph 66, wherein the glycosylated mogroside V is GMG-V20L, GMG-V20S, GMG-V40, or GMG-V60.

68. The composition of any of paragraphs 64 through 67, wherein the steviol glycoside or stevia extract comprises one or more of steviol, stevioside, steyiolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

69. The composition of paragraph 68, wherein the steviol glycoside is rebaudioside A, rebaudioside B, rebaudioside D or mixtures thereof.

70. The composition of paragraph 69, wherein the rebaudioside A is RA98.

71. The composition of any of paragraphs 64 through 70, wherein the mogroside or swingle extract comprises mogroside II, mogroside III, mogroside IV, mogroside V, siamenoside I or 11-oxomogroside V or any combination thereof.

72. A composition comprising a glycosylated mogroside or a glycosylated swingle extract, a glycosylated steviol glycoside or a glycosylated stevia extract, a steviol glycoside or a stevia extract and a mogroside or a swingle extract.

73. The composition of paragraph 72, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

74. The composition of paragraph 73, wherein the glycosylated mogroside or the glycosylated swingle extract comprises glycosylated mogroside V.

75. The composition of paragraph 74, wherein the glycosylated mogroside V is GMG-V20L, GMG-V20S, GMG-V40, or GMG-V60.

76. The composition of any of paragraphs 72 through 75, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

77. The composition of paragraph 76, wherein the glycosylated product is a glycosylated rebaudioside A, a glycosylated rebaudioside B, a glycosylated rebaudioside D or combinations thereof.

78. The composition of any of paragraphs 72 through 77, wherein the steviol glycoside or stevia extract comprises one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside rubusoside, dulcoside A and mixtures thereof.

79. The composition of paragraph 78, wherein the steviol glycoside is rebaudioside A, rebaudioside B, rebaudioside D or mixtures thereof.

80. The composition of paragraph 79, wherein the rebaudioside A is RA98.

81. The composition of any of paragraphs 72 through 80, wherein the mogroside or swingle extract comprises mogroside mogroside III, mogroside IV, mogroside V, siamenoside I or 11-oxomogroside V or any combination thereof.

82. A composition comprising a glycosylated mogroside or a glycosylated swingle extract, a glycosylated steviol glycoside or a glycosylated stevia extract, a steviol glycoside and at least one non-mogroside based sweetener, a non-swingle based sweetener or a non-stevia based sweetener.

83. The composition of paragraph 82, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

84. The composition of paragraph 83, wherein the glycosylated mogroside or the glycosylated swingle extract comprises glycosylated mogroside V.

85. The composition of paragraph 84, wherein the glycosylated mogroside V is GMG-V20L, GMG-V20S, GMG-V40, or GMG-V60.

86. The composition of any of paragraphs 82 through 85, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

87. The composition of paragraph 86, wherein the glycosylated product is a glycosylated rebaudioside A, a glycosylated rebaudioside B, a glycosylated rebaudioside D or combinations thereof.

88. The composition of any of paragraphs 82 through 87, wherein the steviol glycoside or stevia extract comprises one or more of steviol, stevioside, steviolbioside, rebaudioside A, rebaudioside B, rebaudioside C, rebaudioside D, rebaudioside E, rebaudioside rebaudioside M, rebaudioside O, rebaudioside H, rebaudioside I, rebaudioside L, rebaudioside N, rebaudioside K, rebaudioside J, rubusoside, dulcoside A and mixtures thereof.

89. The composition of paragraph 88, wherein the steviol glycoside is rebaudioside A, rebaudioside B, rebaudioside D or mixtures thereof.

90. The composition of paragraph 89, wherein the rebaudioside A is RA98.

91. The composition of any of paragraphs 82 through 80, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA. PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

92. A composition comprising a glycosylated mogroside or a glycosylated swingle extract, a glycosylated steviol glycoside or a glycosylated stevia extract, a mogroside or a swingle extract and at least one non-mogroside based sweetener, a non-swingle based sweetener or a non-stevia based sweetener.

93. The composition of paragraph 92, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

94. The composition of paragraph 93, wherein the glycosylated mogroside or the glycosylated swingle extract comprises glycosylated mogroside V.

95. The composition of paragraph 94, wherein the glycosylated mogroside V is GMG-V20L, GMG-V20S, GMG-V40, or GMG-V60.

96. The composition of any of paragraphs 92 through 95, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside rebaudioside I, rebaudioside L, rebaudioside N, rebaudioside K, rebaudioside J, rubusoside, dulcoside A and mixtures thereof.

97. The composition of paragraph 96, wherein the glycosylated product is a glycosylated rebaudioside A, a glycosylated rebaudioside B, a glycosylated rebaudioside D or combinations thereof.

98. The composition of any of paragraphs 92 through 97, wherein the mogroside or swingle extract comprises mogroside II, mogroside III, mogroside IV, mogroside V, siamenoside I or 11-oxomogroside V or any combination thereof.

99. The composition of any of paragraphs 92 through 98, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

100. A composition comprising a glycosylated mogroside or a glycosylated swingle extract, a glycosylated steviol glycoside or a glycosylated stevia extract, a steviol glycoside or a stevia extract, a mogroside or a swingle extract and a non-mogroside based sweetener, a non-swingle based sweetener or a non-stevia based sweetener.

101. The composition of paragraph 100, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

102. The composition of paragraph 101, wherein the glycosylated mogroside or the glycosylated swingle extract comprises glycosylated mogroside V.

103. The composition of paragraph 102, wherein the glycosylated mogroside V is GMG-V20L, GMG-V20S, GMG-V40, or GMG-V60.

104. The composition of any of paragraphs 100 through 103, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

105. The composition of paragraph 104, wherein the glycosylated product is a glycosylated rebaudioside A, a glycosylated rebaudioside B, a glycosylated rebaudioside D or combinations thereof.

106. The composition of any of paragraphs 100 through 105, wherein the steviol glycoside or stevia extract comprises one or more of steviol, stevioside, steviolbioside, rebaudioside A, rebaudioside B, rebaudioside C, rebaudioside D, rebaudioside E, rebaudioside rebaudioside M, rebaudioside O, rebaudioside H, rebaudioside I, rebaudioside L, rebaudioside N, rebaudioside K, rebaudioside J, rubusoside, dulcoside A and mixtures thereof.

107. The composition of paragraph 106, wherein the steviol glycoside is rebaudioside A, rebaudioside B, rebaudioside D or mixtures thereof.

108. The composition of paragraph 107, wherein the rebaudioside A is RA98.

109. The composition of any of paragraphs 100 through 108, wherein the mogroside or swingle extract comprises mogroside mogroside III, mogroside IV, mogroside V, siamenoside I or 11-oxomogroside V or any combination thereof.

110. The composition of any of paragraphs 100 through 109, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

111. A composition comprising a mogroside or a swingle extract and a glycosylated steviol glycoside or a glycosylated stevia extract.

112. The composition of paragraph 111, wherein the mogroside or swingle extract comprises mogroside II, mogroside III, mogroside IV, mogroside V, siamenoside I or 11-oxomogroside V or any combination thereof.

113. The composition of either paragraphs 111 or 112, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

114. The composition of paragraph 113, wherein the glycosylated product is a glycosylated rebaudioside A, a glycosylated rebaudioside B, a glycosylated rebaudioside D or combinations thereof.

115. A composition comprising a mogroside or a swingle extract, a glycosylated steviol glycoside or a glycosylated stevia extract and a steviol glycoside or a stevia extract.

116. The composition of paragraph 116, wherein the mogroside or swingle extract comprises mogroside II, mogroside III, mogroside IV, mogroside V, siamenoside I or 11-oxomogroside V or any combination thereof.

117. The composition of either paragraphs 115 or 116, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

118. The composition of paragraph 117, wherein the glycosylated product is a glycosylated rebaudioside A, a glycosylated rebaudioside B, a glycosylated rebaudioside D or combinations thereof.

119. The composition of any of paragraphs 115 through 118, wherein the steviol glycoside or stevia extract comprises one or more of steviol, stevioside, steviolbioside, rebaudioside A, rebaudioside B, rebaudioside C, rebaudioside D, rebaudioside E, rebaudioside rebaudioside M, rebaudioside O, rebaudioside H, rebaudioside I, rebaudioside L, rebaudioside N, rebaudioside K, rebaudioside J, rubusoside, dulcoside A and mixtures thereof.

120. The composition of paragraph 119, wherein the steviol glycoside is rebaudioside A, rebaudioside B, rebaudioside D or mixtures thereof.

121. The composition of paragraph 120, wherein the rebaudioside A is RA98.

122. A composition comprising a mogroside or a swingle extract, a glycosylated steviol glycoside or a glycosylated stevia extract and at least one non-mogroside based sweetener, a non-swingle based sweetener or a non-stevia based sweetener.

123. The composition of paragraph 122, wherein the mogroside or swingle extract comprises mogroside II, mogroside IFF, mogroside IV, mogroside V, siamenoside I or 11-oxomogroside V or any combination thereof.

124. The composition of either paragraphs 122 or 123, wherein the glycosylated steviol glycoside or glycosylated stevia extract comprises one or more of the glycosylation products of steviol, stevioside, steviolbioside, rebaudioside A, rebaudioside B, rebaudioside C, rebaudioside rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

125. The composition of paragraph 124, wherein the glycosylated product is a glycosylated rebaudioside A, a glycosylated rebaudioside B, a glycosylated rebaudioside D or combinations thereof.

126. The composition of any of paragraphs 122 through 125, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

127. A composition comprising a mogroside or a swingle extract, a glycosylated steviol glycoside or a glycosylated stevia extract, a steviol glycoside or a stevia extract and at least one non-mogroside based sweetener, a non-swingle based sweetener or a non-stevia based sweetener.

128. The composition of paragraph 127, wherein the mogroside or swingle extract comprises mogroside II, mogroside mogroside IV, mogroside V, siamenoside I or 11-oxomogroside V or any combination thereof.

129. The composition of either paragraphs 127 or 128, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

130. The composition of paragraph 129, wherein the glycosylated product is a glycosylated rebaudioside A, a glycosylated rebaudioside B, a glycosylated rebaudioside or combinations thereof.

131. The composition of any of paragraphs 127 through 130, wherein the steviol glycoside or stevia extract comprises one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

132. The composition of paragraph 131, wherein the steviol glycoside is rebaudioside A, rebaudioside B, rebaudioside I) or mixtures thereof.

133. The composition of paragraph 132, wherein the rebaudioside A is RA98.

134. The composition of any of paragraphs 127 through 133, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PRIMA™ allulose, inulin N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

135. A composition comprising a glycosylated steviol glycoside or a glycosylated stevia extract, a steviol glycoside or a stevia extract, a mogroside and at least one non-mogroside based sweetener, a non-swingle based sweetener or a non-stevia based sweetener.

136. The composition of paragraph 135, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside rebaudioside M, rebaudioside O, rebaudioside H, rebaudioside I, rebaudioside L, rebaudioside N, rebaudioside K, rebaudioside J, rubusoside, dulcoside A and mixtures thereof.

137. The composition of any of paragraphs 135 or 136, wherein the steviol glycoside or stevia extract comprises one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

138. The composition of paragraph 137, wherein the steviol glycoside is rebaudioside A, rebaudioside B, rebaudioside D or mixtures thereof.

139. The composition of paragraph 138, wherein the rebaudioside A is RA98.

140. The composition of any of paragraphs 135 through 139, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhatnnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

141. The composition of paragraph 140, wherein the non-mogroside based sweetener is sucrose.

142. The composition of any of paragraphs 1 through 141, further comprising a sweetener enhancer.

143. The composition of paragraph 142, wherein the sweetener enhancer is one or more of thaumatin, brazzein, miraculin, curculin, pentadin, and/or mabinlin.

144. The composition of paragraph 143, wherein the sweetener enhancer is present in the composition at a range of about 0.5 ppm to about 10 ppm.

145. The composition of paragraph 144, further comprising sugar.

146. The composition of paragraph 155, wherein the sugar is present in the composition at a range of about 1 to about 10 weight percent.

147. The composition of any of paragraphs 1 through 146, further comprising a salt or cyclodextrin.

148. The composition of paragraph 147, wherein the salt comprises one or salts, comprising sodium carbonate, sodium bicarbonate, sodium chloride, potassium chloride, magnesium chloride, sodium sulfate, magnesium sulfate, potassium sulfate, or any edible salt.

149. The composition of any of paragraphs 1 through 146, wherein the composition taste characteristics is below the sweetness detection threshold and serves as a flavor.

150. The composition of any of paragraphs 1 through 146, wherein the composition taste characteristics is above the sweetness detection threshold and serves as a sweetener.

151. The composition of any of paragraphs 1 through 146, further comprising a consumable.

151. The composition of any of paragraphs 1 through 146, further comprising a consumable.

Additional embodiments include, but are not limited to the following paragraphs 1 through 32.

1. A composition comprising a glycosylated mogroside or a glycosylated swingle extract and at least one non-mogroside based sweetener, a non-swingle based sweetener or a non-stevia based sweetener.

2. The composition according to paragraph 1, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

3. The composition according to paragraph 1 or 2, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

4. The composition of paragraph 3, wherein the glycosylated mogroside or the glycosylated swingle extract comprises glycosylated mogroside V.

5. The composition of paragraph 4, wherein the glycosylated mogroside V is GMG-V20L, GMG-V20S, GMG-V40, or GMG-V60.

6. The composition according to paragraph 1 or 2, wherein the ratio of the glycosylated mogroside or the glycosylated swingle extract to the non-mogroside sweetener is from 200:1 to about 1:2000 on a weight basis.

7. A composition comprising a glycosylated mogroside or a glycosylated swingle extract and a glycosylated steviol glycoside or a glycosylated stevia extract.

8. The composition of paragraph 7, wherein the glycosylated mogroside or the glycosylated swingle extract comprises a glycosylated mogroside II, a glycosylated mogroside III a glycosylated mogroside IV, a glycosylated mogroside V, a glycosylated siamenoside I or a glycosylated 11-oxomogroside V or any combination thereof.

9. The composition according to paragraph 7 or 8, wherein the glycosylated mogroside or the glycosylated swingle extract comprises a glycosylated mogroside V.

10. The composition of paragraph 9, wherein the glycosylated mogroside V is GMG-V20L, GMG-V20S, GMG-V40, or GMG-V60.

11. The composition according to paragraph 7 or 8, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M. rebaudioside O, rebaudioside H, rebaudioside I, rebaudioside L, rebaudioside N, rebaudioside K, rebaudioside J, rubusoside, dulcoside A and mixtures thereof.

12. The composition of paragraph 11, wherein the glycosylated product is a glycosylated rebaudioside A, a glycosylated rebaudioside B, a glycosylated rebaudioside D or combinations thereof.

13. The composition according to paragraph 7 or 8, wherein the ratio of the glycosylated mogroside or the glycosylated swingle extract to the glycosylated steviol glycoside or glycosylated stevia extract is from 3:1 to about 1:3 on a weight basis.

14. A composition comprising a glycosylated mogroside or a glycosylated swingle extract, a mogroside or swingle extract and optionally at least one non-mogroside based sweetener, a non-swingle based sweetener or a non-stevia based sweetener or a steviol glycoside or stevia extract.

15. The composition of paragraph 14, wherein the non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

16. The composition according to paragraph 14 or 15, wherein the glycosylated mogroside or the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or any combination thereof.

17. The composition of paragraph 16, wherein the glycosylated mogroside or the glycosylated swingle extract comprises glycosylated mogroside V.

18. The composition of paragraph 17, wherein the glycosylated mogroside V is GMG-V20L, GMG-V20S, GMG-V40, or GNIG-V60.

19. The composition according to paragraph 14 or 15, wherein the mogroside or swingle extract comprises mogroside II, mogroside III, mogroside IV, mogroside V, siamenoside I or 11-oxomogroside V or any combination thereof.

20. The composition of paragraph 14 or 15, wherein the steviol glycoside or the stevia extract comprises one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

21. A composition comprising a mogroside or a swingle extract and a glycosylated steviol glycoside or a glycosylated stevia extract and optionally at last one non-mogroside based sweetener, a non-swingle based sweetener or a non-stevia based sweetener or a steviol glycoside or stevia extract.

22. The composition of paragraph 21, wherein the mogroside or swingle extract comprises mogroside II, mogroside mogroside IV, mogroside V, siamenoside I or 11-oxomogroside V or any combination thereof.

23. The composition according to paragraph 21 or 22, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

24. The composition of paragraph 23, wherein the glycosylated product is a glycosylated rebaudioside A, a glycosylated rebaudioside B, a glycosylated rebaudioside D or combinations thereof.

25. A composition comprising a glycosylated steviol glycoside or a glycosylated stevia extract, a steviol glycoside or a stevia extract, a mogroside or swingle extract and optionally at least one non-mogroside based sweetener, a non-swingle based sweetener or a non-stevia based sweetener.

26. The composition of paragraph 25, wherein the glycosylated steviol glycoside or glycosylated stevia extract comprises one or more of the glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside rebaudioside L, rebaudioside N, rebaudioside K, rebaudioside J, rubusoside, dulcoside A and mixtures thereof.

27. The composition according to paragraph 25 or 26, wherein the steviol glycoside or stevia extract comprises one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A and mixtures thereof.

28. The composition of paragraph 27, wherein the steviol glycoside is rebaudioside A, rebaudioside B, rebaudioside D or mixtures thereof.

29. The composition of paragraph 28, wherein the rebaudioside A is RA98.

30. The composition according to paragraph 25 or 26, wherein the mogroside or swingle extract comprises mogroside II, mogroside III, mogroside IV, mogroside V, siamenoside I or 11-oxomogroside V or any combination thereof.

31. The composition according to paragraph 25 or 26, wherein the optional non-mogroside based sweetener, the non-swingle based sweetener or the non-stevia based sweetener comprises one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia acesulfame-K, neotame, thaumatin, brazzein, miraculin, curculin, pentadin, mabinlin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, monellin, or sodium cyclamate and mixtures thereof.

32. The composition of paragraph 31, wherein the non-mogroside based sweetener is sucrose or thaumatin.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Example 1

Preparation of Glycosylated Swingle Extract Containing Mogroside V (Abbreviated as "GMC-V")

1.1 Glycosylation of mogroside V 20% (herein, the percentage refers to the purity of mogroside V in dried swingle extract containing mogroside V before transgylcosylation is 20% by weight. Thus the sample of the glycosylated dried swingle extract in the example 1.1 is abbreviated as "GMG- V20L" and abbreviated names of the samples in the examples that follow are named using this nomenclature.

20 g mogroside V 20% (available from Hunan Huacheng Biotech, Inc.), 20 g tapioca dextrin and 200 ml water were mixed. The pH was adjusted to 5.9, then 1 ml CGTase was added and the mixture was stirred for 48 hours at 60-70° C. The mixture was then heated to 80° C. for 30 minutes, followed by spray drying the resulting mixture to provide 34 g product GMG-V20L.

1.2 Glycosylation of Mogroside V 20% (Abbreviated as "GMG-V20S")

20 g mogroside V 20%, 20 g tapioca dextrin and 200 ml water were mixed. The pH was adjusted to 5.9, then 1 ml CGTase was added and the mixture was stirred for 48 hours at 60-70° C. The mixture was then heated to 80° C. for 30 minutes followed by cooling to 60-70° C. 1 ml amylase was added with stirring for 24 hours. The resultant mixture was heated to 80° C. for 30 minutes followed by spray drying to provide 35 g product GMG-V20S.

1.3 Glycosylation of Mogroside V 40% (Abbreviated as "GMG-V40")

20 g mogroside V 40% (available from Hunan Huacheng Biotech, Inc.), 20 g tapioca dextrin and 200 ml water were mixed. The pH was adjusted to 5.9, then 1 ml CGTase was added and the mixture was stirred for 48 hours at 60-70° C. The mixture was heated to 80° C. for 30 minutes followed by spray drying to provide 33 g product GMG-V40.

1.4 Glycosylation of Mogroside V 60% (Abbreviated as "GMG-V60")

100 g mogroside V 60% (available from Hunan Huacheng Biotech, Inc.), 100 g tapioca dextrin and 1000 ml water were mixed. The pH was adjusted to 5.9, then 1 ml CGTase was added and the mixture was stirred for 48 hours at 60-70° C. The mixture was heated to 80° C. for 30 minutes followed by spray drying to provide 186 g product GMG-V60.

Example 2

Evaluation of the Sweetness Detection Threshold:

To evaluate the sweetness potency of various concentrations of GMG or MGV in aqueous solutions, aqueous solutions of GMG and MGV at various concentrations were prepared and were evaluated at room temperature. The sample solutions were evaluated by 8 panelists that were previously qualified for their taste acuity. Samples coded with triple digit numbers were given to a panelist randomly. Panelists tasted the samples randomly. After tasting a sample, every panelist was required to wash their mouth with water and rest for 60 seconds. Panelists gave ratings of "sweet" or "not sweet" to each sample.

The results are as follow:

2.1 GMG-V20L Concentration on Sweetness Detection Threshold

It can be seen from FIG. 1 that the sweetness detection threshold of GMG-V20L is about 1000 ppm.

2.2 GMG-V20S Concentration on Sweetness Detection Threshold

Figure 2:
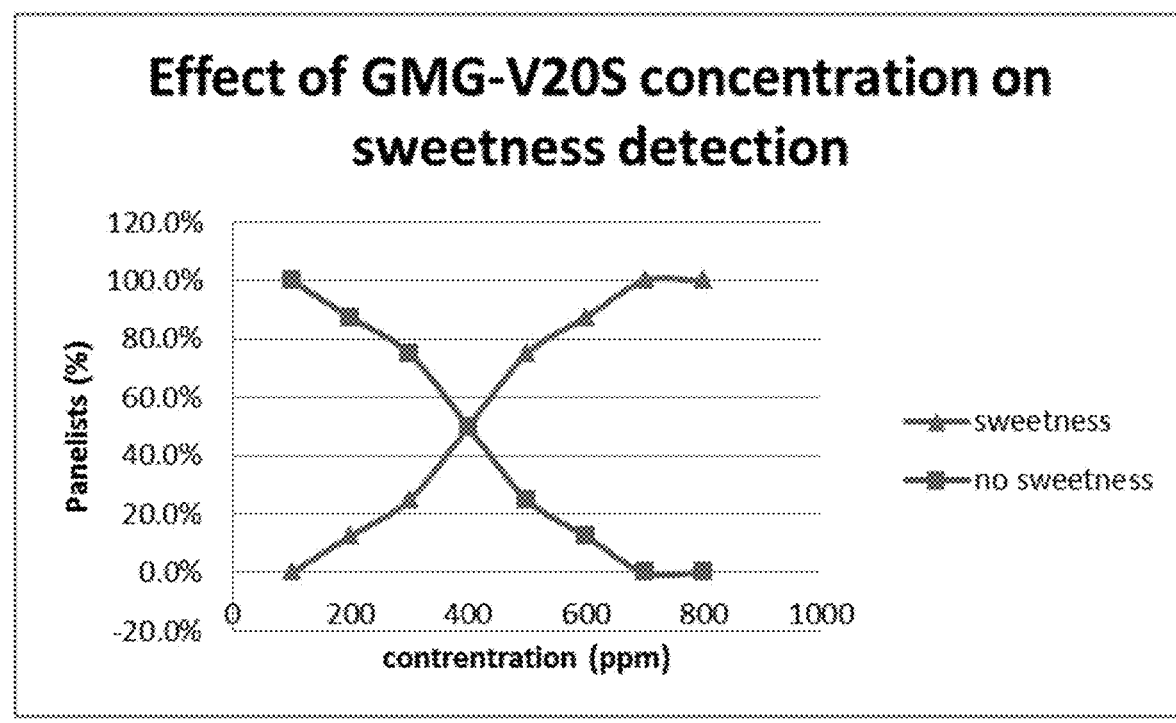
FIG. 2 is an evaluation curve of the sweetness detection threshold of GMG-V20S.

It can be seen from FIG. 2 that the sweetness detection threshold of GMG-V20S is about 400 ppm.

2.3 GMG-V40 Concentration on Sweetness Detection Threshold

Figure 3:
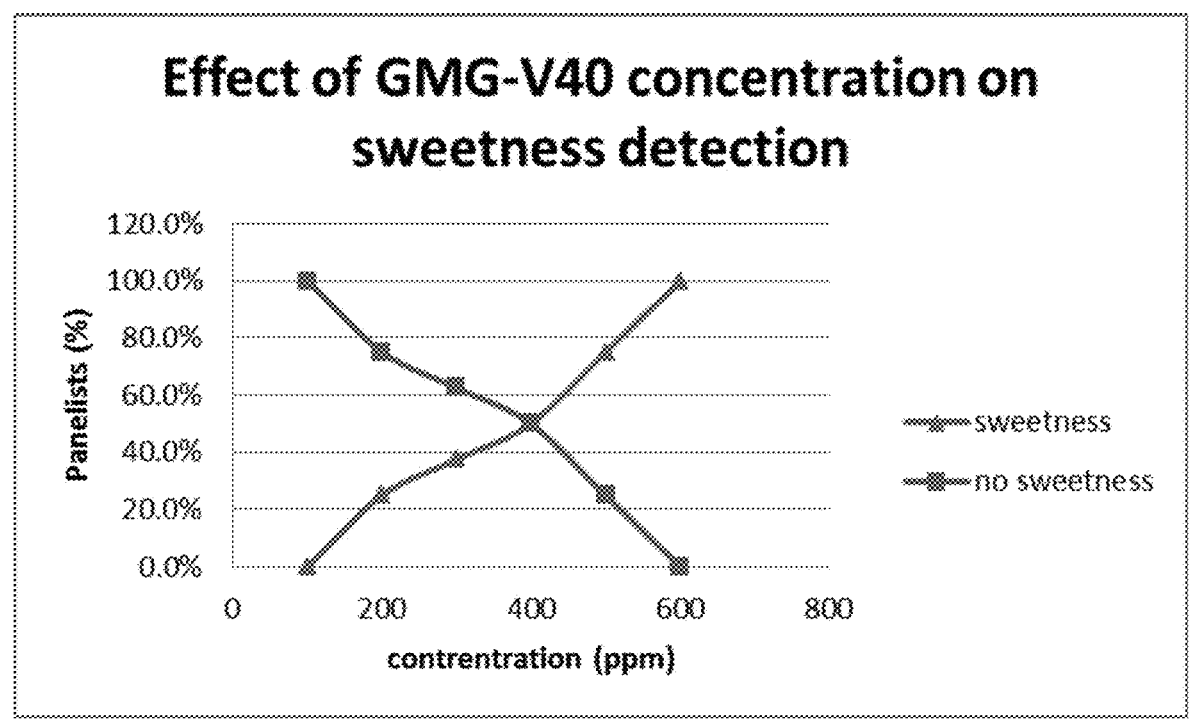
FIG. 3 is an evaluation curve of the sweetness detection threshold of GMG-V40.

It can be seen from FIG. 3 that the sweetness detection threshold of GMG-V40 is about 400 ppm.

2.4 GMG-V60 Concentration on Sweetness Detection Threshold

Figure 4:
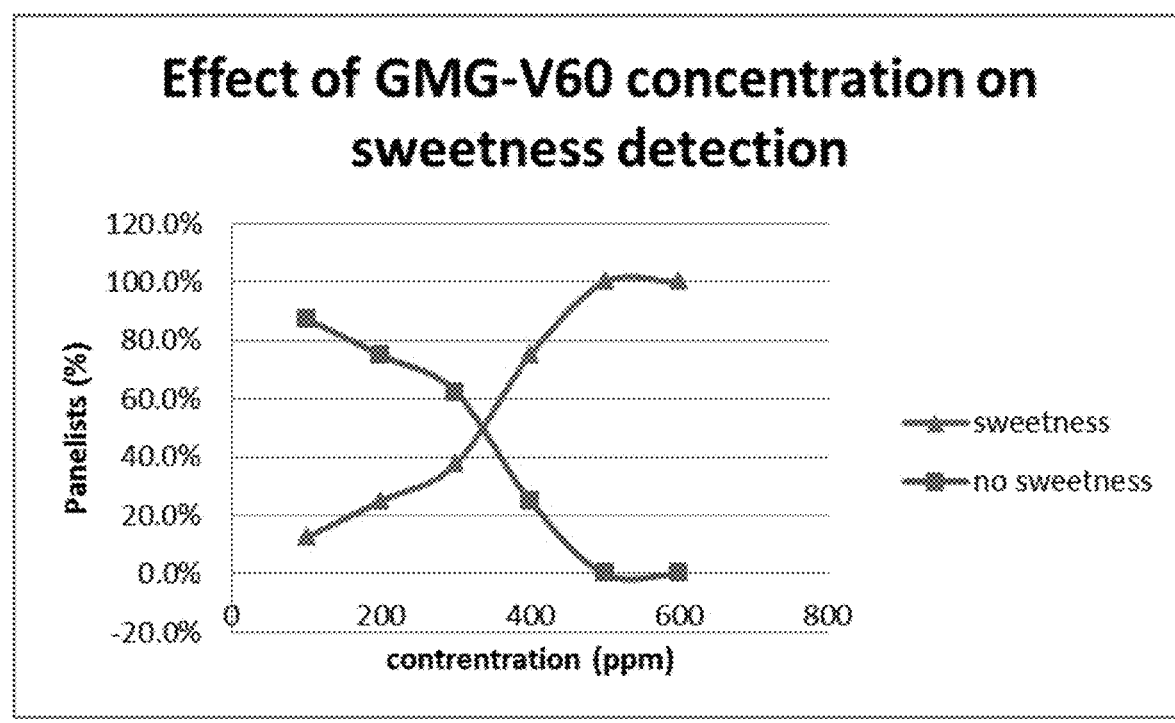
FIG. 4 is an evaluation curve of the sweetness detection threshold of GMG-V60.

It can be seen from FIG. 4 that the sweetness detection threshold of GMG-V60 is about 300 ppm.

2.5 MGV20 Concentration on Sweetness Detection Threshold

Figure 5:
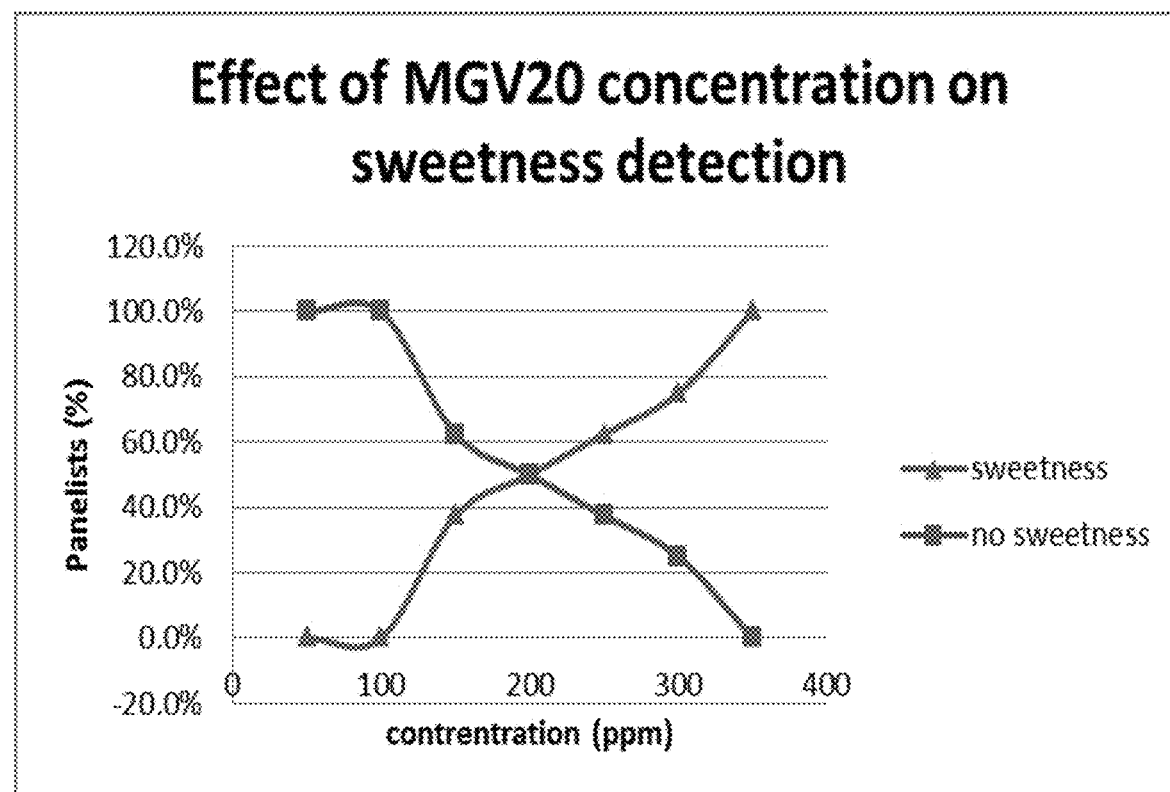
FIG. 5 is an evaluation curve of the sweetness detection threshold of MGV20.

It can be seen from FIG. 5 that the sweetness detection threshold of MGV20 herein, "MGV20" means the dried swingle extract without glycosylation wherein the purity of mogroside V is 20% by weight) is about 200 ppm.

Example 3

Synergistic Taste Effects of GMG to Sugar:

3.1 Conditions

The samples were tested in aqueous solution of citric acid at pH 3.8. The concentration by weight of the samples used in the test are shown in Table 2:

TABLE 2

| Sample No. | Sugar | GMG-V20L | GMG-V40 | GMG-V60 |
|---|---|---|---|---|
| 698 | 7% | — | — | |
| 201 | 6% | 200 ppm | — | |
| 352 | 6% | — | 200 ppm | |
| 776 | 6% | — | — | 200 ppm |

3.2 The Evaluation of Taste Profile was Carried Out by the Procedure as Follows:

I. The components where mixed and then dissolved in aqueous citric acid (pH 3.8) with ultrasound at room temperature and left to equilibrate for 30 minutes.

II. Panel: 8 persons

III. Method:

The sample solutions were evaluated by 8 panelists that have been previously qualified for their taste acuity. Samples coded with triple digit numbers were given to the panelist randomly. Panelists tasted the samples randomly. After tasting a sample, every panelist was required to rinse their mouth with water and rest for 60 seconds. For the sweetness evaluation of each sample, the sample was tested in pairs with several sugar solutions of given sweetness, such as 5%, 6%, 7%, 8%, 9%, or 10% as standard reference samples. The sweetness of each sample was compared with those of the reference sugar solutions, and the sweetness was evaluated and recorded according to the judgment that the sweetness of the sample was similar to a specific sugar solution or between specific sugar solutions. The results were recorded as the mean value of the results provided by the panels.

For evaluation of taste profile, the samples were tested and were compared to reference sugar solutions. Panelists judged if the taste profile of sample solutions were similar to that of sugar.

3.3 Results

The taste profile of Sugar/GMG compositions are shown in Table 3.

TABLE 3

| Sample No. | Sugar | GMG-V20L | GMG-V40 | GMG-V60 | SE | Taste profile |
|---|---|---|---|---|---|---|
| 201 | 6% | 200 ppm | — | — | 7% | Very sugar-like |
| 352 | 6% | — | 200 ppm | — | 7.5% | Very sugar-like |
| 776 | 6% | — | — | 200 ppm | 8% | Very sugar-like |

3.4. Discussion

The synergistic effects are shown in Table 4.

TABLE 4

| GMG | Concentration of GMG | Concentration of sugar | SE | Increased SE by GMG | sweetness (ppm sugar) of GMG per ppm* |
|---|---|---|---|---|---|
| GMG-V20L | 200 ppm | 6% | 7% | 1% | 50 |
| GMG-V40 | 200 ppm | 6% | 7.5% | 1.5% | 75 |
| GMG-V60 | 200 ppm | 6% | 8% | 2% | 100 |

*sweetness (ppm sugar) of GMG per ppm = (Measured SE − Concentration of sugar)/concentration of GMG Regarding the synergistic effect, it was found that although the concentration of GMG at 200 ppm did not have sweetness, it increased the sweetness potency of sugar. GMG added 1%-2% SE without any change in taste. This result means that GMG has a surprising synergistic effect with sugar.

In the following examples, the GSG(s) used in the tests as raw materials may be prepared by common methods known in the art or may be purchased commercially. The detailed components contained in the GSG(s) used are given as follows.

Dextrin is dissolved in water (e.g., reverse osmosis water) to which a stevia extract with a total steviol glycoside content of about 70% to about 99% is added. CGTase enzyme is added to the mixture and the mixture is incubated for a desired period of time to glycosylate the steviol glycosides with glucose molecules from the tapioca dextrin. After a suitable ratio of GSG(s) and residual steviol glycoside content is achieved, the mixture is heated to about 90° C. to about 100° C. for about 30 minutes to inactivate the CGTase, which is then removed by filtration. The resultant solution can be decolorized and/or spray dried to provide a mixture of glycosylated steviol glycoside(s) (GSG(s)), residual steviol glycosides (SGs) and dextrin.

RA 98 contains about pure RA 98%.

Moreover, GSG-RA20 contains total GSG components of about 75%, specifically as the following components, characterized by HPLC-MS, as shown table 5A as follows.

TABLE 5A

| Basic structure | Specification | Actual Test Result (% m/m) | Mass fragment $[M - 2H^+]^{-2}$ | Mass fragment $[M - H^+]^{-1}$ | R-A derived (% m/m)* | Stv derived (% m/m)* | Reb C derived (% m/m)** |
|---|---|---|---|---|---|---|---|
| ST-G1 | | 11.52 | 563 | 1128 | 4.98 | 3.63 | 2.91 |
| ST-G2 | | 8.48 | 644 | 1290 | 3.57 | 2.90 | 2.00 |
| ST-G3 | | 10.21 | 725 | 1452 | 4.30 | 3.21 | 2.70 |
| ST-G4 | | 12.02 | 806 | 1614 | 5.37 | 3.84 | 2.80 |
| ST-G5 | | 8.02 | 887 | 1776 | 3.45 | 2.71 | 1.86 |
| ST-G6 | | 5.85 | 968 | 1938 | 2.58 | 1.94 | 1.33 |
| ST-G7 | | 2.24 | 1049 | 2100 | 1.00 | 0.77 | 0.46 |
| ST-G8 | | 5.83 | 1130 | 2262 | 2.65 | 1.89 | 1.29 |
| ST-G9 | | 4.69 | 1211 | 2424 | 1.97 | 1.55 | 1.16 |
| ST-G10 | | 3.74 | 1292 | 2586 | 1.58 | 1.28 | 0.88 |
| ST-G11 | | 1.65 | 1373 | 2748 | 0.75 | 0.57 | 0.33 |
| Total GSG | 75 | 74.25 | 1454 | 2910 | 34.30 | 24.65 | 15.30 |
| Stevioside | 6 | 6.56 | | | | | |
| SGs | 4 | | | | | | |
| Dextrin | 20 | <=20 | | | | | |

*estimated from chromatogram comparison of Reb-A GSGs to STV GSGs

**estimated from unique mass of Reb-C fragments

HPLC-MS Parameters

HPLC-system: Agilent 1100 (quart. Pump, Autosampler, Column oven, UV/VIS-detector coupled to Agilent ESI MS (G-1956 A) operated at 350° C., 12 L/min N2. Fragmentor: 150, pos. Scan mode.

Mobile Phase: Acetonitrile/0.01% acetic acid=95/5 at 0 min to 80/20 at 20 min (linear gradient) hold for another 20 minutes, return to source conditions.

Column: Supelcosil-LC-NH2, 250×4.6 mm, 5 μm
Flow rate: 1 mL/min
Temperature: 35° C.
Injection vol: 0.015 mL GSG-RA50 was characterize by HPLC-MS and the ratios of GSGs are shown in Table 5B.

TABLE 5B

| Compound | Area | mg RA/100 ml | mol mass | mg/100 ml | % of total sample |
|---|---|---|---|---|---|
| — | 52.9 | 2.42 | | 2.42 | 1.79 |
| ST-G1 | 250 | 3.82 | 967 | 3.82 | 2.83 |
| ST-G1 | 114 | 2.85 | 967 | 2.85 | 2.11 |
| RA-G1 | 288 | 4.09 | 1129 | 4.77 | 3.54 |
| RA-G1 | 393 | 4.84 | 1129 | 5.65 | 4.18 |
| ST-G2 | 110 | 2.82 | 1129 | 3.30 | 2.44 |
| RA-G2 | 479 | 5.44 | 1291 | 7.27 | 5.38 |
| RA-G2 | 341 | 4.46 | 1291 | 5.96 | 4.41 |
| ST-G3 | 105 | 2.78 | 1291 | 3.72 | 2.75 |
| RA-G3 | 470 | 5.39 | 1453 | 8.09 | 5.99 |
| RA-G3 | 319 | 4.31 | 1453 | 6.47 | 4.80 |
| ST-G4 | 87.6 | 2.66 | 1453 | 4.00 | 2.97 |
| RA-G4 | 408 | 4.94 | 1615 | 8.25 | 6.11 |
| ST-G5 | 346 | 4.50 | 1615 | 7.51 | 5.57 |
| RA-G5 | 329 | 4.38 | 1777 | 8.05 | 5.96 |
| ST-G6 | 286 | 4.07 | 1777 | 7.48 | 5.54 |
| RA-G6 | 311 | 4.25 | 1939 | 8.53 | 6.32 |
| ST-G7 | 173 | 3.27 | 1939 | 6.56 | 4.86 |
| RA-G7 | 184 | 3.35 | 2101 | 7.28 | 5.39 |
| >RA/ST-G7 | 232 | 3.69 | 2263 | 8.64 | 6.40 |
| Sum: | | 78.35 | | 120.63 | 89.35 |

GSG-RA80 was characterized by HPLC-MS and the ratios of GSGs are shown in Table 5C.

TABLE 5C

| Compound | Area | mg RA/100 ml | mol mass | mg/100 ml | % of total sa |
|---|---|---|---|---|---|
| RA-G1 | 1545 | 13.0 | 1129 | 15.2 | 12.7 |
| RA-G2 | 1848 | 15.2 | 1291 | 20.3 | 16.9 |
| RA-G3 | 1458 | 12.4 | 1453 | 18.7 | 15.6 |
| RA-G4 | 1001 | 9.15 | 1615 | 15.3 | 12.8 |
| RA-G5 | 631 | 6.53 | 1777 | 12.0 | 10.0 |
| RA-G6 | 383 | 4.77 | 1939 | 9.58 | 8.0 |
| RA-G7 | 179 | 3.32 | 2101 | 7.09 | 6.0 |
| >RA-G7 | 332 | 4.40 | 2263 | 10.3 | 8.6 |
| Sum: | | 68.8 | | 109 | 90.6 |

Example 4

Synergistic taste effects of GMG and GSG blend to sugar
The following tests were carried out as follows:
4.1 Conditions
The samples were tested in aqueous solution of citric acid at pH 3.8:
The concentration by weight of all samples used in the test are shown in Tables 5 and 5'.

TABLE 5

| Sample No. | Sugar | GMG-V20L | GMG-V40 | GMG-V60 | GSG-RA20 |
|---|---|---|---|---|---|
| 523 | — | 200 ppm | — | — | 200 ppm |
| 368 | — | — | 200 ppm | — | 200 ppm |
| 662 | — | — | — | 200 ppm | 200 ppm |
| 285 | 6% | 200 ppm | — | — | 200 ppm |
| 766 | 6% | — | 200 ppm | — | 200 ppm |
| 347 | 6% | — | — | 200 ppm | 200 ppm |
| 344 | 2.1% | 200 ppm | — | — | 200 ppm |
| 518 | 2.1% | — | 200 ppm | — | 200 ppm |
| 928 | 2.1% | — | — | 200 ppm | 200 ppm |

TABLE 5

| Sample No. | Sugar | GMG-V20L | GSG-RA50 | GSG-RA80 |
|---|---|---|---|---|
| 671 | — | 200 ppm | 100 ppm | — |
| 108 | 6% | 200 ppm | 100 ppm | — |
| 215 | — | 200 ppm | — | 100 ppm |
| 405 | 6% | 200 ppm | — | 100 ppm |

4.2. Evaluation Method:

The panel composition, the method of sample preparation and the method of taste evaluation are all the same as that described for Example 3.

4.3 Results

The taste profile of Sugar/GMG/GSG composition(s) is as shown in Tables 6 and 6'. The results were as follows:

TABLE 6

| Sample No. | Sugar | GMG-V20L | GMG-V40 | GMG-V60 | GSG-RA20 | SE | Taste profile |
|---|---|---|---|---|---|---|---|
| 523 | — | 200 ppm | — | — | 200 ppm | — | Almost cannot note any taste |
| 368 | — | — | 200 ppm | — | 200 ppm | — | Almost cannot note any taste |
| 662 | — | — | — | 200 ppm | 200 ppm | — | Almost cannot note any taste |
| 285 | 6% | 200 ppm | — | — | 200 ppm | 10% | Very sugar-like |
| 766 | 6% | — | 200 ppm | — | 200 ppm | 10.5% | Very sugar-like |
| 347 | 6% | — | — | 200 ppm | 200 ppm | 11% | Very sugar-like |
| 344 | 2.1% | 200 ppm | — | — | 200 ppm | 6% | Very sugar-like |
| 518 | 2.1% | — | 200 ppm | — | 200 ppm | 6.2% | Very sugar-like |
| 978 | 2.1% | — | — | 200 ppm | 200 ppm | 7% | Very sugar-like |

TABLE 6'

| Sample No. | Sugar | GMG-V20L | GSG-RA50 | GSG-RA80 | SE | Taste profile |
|---|---|---|---|---|---|---|
| 671 | — | 200 ppm | 100 ppm | — | — | Almost cannot feel any taste |
| 108 | 6% | 200 ppm | 100 ppm | — | 9% | Very sugar-like |
| 215 | — | 200 ppm | — | 100 ppm | — | Almost cannot feel any taste |
| 405 | 6% | 200 ppm | — | 100 ppm | 10% | Very sugar-like |

4.4. Discussion

The synergistic effects are provided in Tables 7 and 7'.

TABLE 7

| GMG | Concentration of GMG | Concentration of GSG-RA20 | Concentration of sugar | SE | Increased SE by GMG + GSG | sweetness (ppm sugar) of GMG + GSG per ppm* |
|---|---|---|---|---|---|---|
| GMG-V20L | 200 ppm | 200 ppm | — | — | — | — |
| GMG-V40 | 200 ppm | 200 ppm | — | — | — | — |
| GMG-V60 | 200 ppm | 200 ppm | — | — | — | — |
| GMG-V20L | 200 ppm | 200 ppm | 6% | 10% | 4% | 100 |
| GMG-V40 | 200 ppm | 200 ppm | 6% | 10.5% | 4.5% | 112.5 |
| GMG-V60 | 200 ppm | 200 ppm | 6% | 11% | 5% | 12.5 |
| GMG-V20L | 200 ppm | 200 ppm | 2.1% | 6% | 3.9% | 97.5 |
| GMG-V40 | 200 ppm | 200 ppm | 2.1% | 6.2% | 4.1% | 102.5 |
| GMG-V60 | 200 ppm | 200 ppm | 2.1% | 7% | 4.9% | 175 |

*sweetness (ppm sugar) of GMG + GSG per ppm = (Measured SE − Concentration of sugar)/concentration of GMG + GSG With regard to the synergistic effect, it was found that although the concentration of GMG+GSG at 400 ppm had very low or almost no sweetness, it notably increased the sweetness potency of sugar. It added 4%-5% SE without any change in taste. This result means that GMG+GSG has a synergistic effect with sugar.

TABLE 7'

| Concentration of GMG-V20L | Concentration of GSG-RA50 | Concentration of GSG-RA80 | Concentration of sugar | SE | Increased SE by GMG + GSG | sweetness (ppm sugar) of GMG + GSG per ppm* |
|---|---|---|---|---|---|---|
| 200 ppm | 100 ppm | — | — | — | — | — |
| 200 ppm | 100 ppm | — | 6% | 9% | 3% | 100 |
| 200 ppm | — | 100 ppm | — | — | — | — |
| 200 ppm | — | 100 ppm | 6% | 10% | 4% | 133 |

*sweetness (ppm sugar) of GMG + GSG per ppm = Measured SE − Concentration of sugar)/concentration of GMG + GSG With regard to the synergistic effect, it was found that although the concentration of GMG+GSG at 300 ppm had very low or almost no sweetness, it notably increased the sweetness potency of sugar. It added 3%-4% SE without any change in taste. This result means that GMG+GSG has a synergistic effect with sugar.

Example 5

Synergistic Taste Effects of GMG to RA 5.1 Conditions

The samples were tested in aqueous solution of citric acid at pH 3.8.

The concentration by weight of the samples used in the test are shown in Table 8:

TABLE 8

| Sample No. | RA98 | GMG-V20L | GMG-V40 | GMG-V60 |
|---|---|---|---|---|
| 201 | 300 ppm | — | — | — |
| 427 | 300 ppm | 100 ppm | — | — |
| 101 | 300 ppm | 200 ppm | — | — |
| 624 | 300 ppm | 300 ppm | — | — |
| 610 | 300 ppm | — | 100 ppm | — |
| 410 | 300 ppm | — | 200 ppm | — |
| 206 | 300 ppm | — | 300 ppm | — |

TABLE 8-continued

| Sample No. | RA98 | GMG-V20L | GMG-V40 | GMG-V60 |
|---|---|---|---|---|
| 529 | 300 ppm | — | — | 100 ppm |
| 065 | 300 ppm | — | — | 200 ppm |
| 113 | 300 ppm | — | — | 300 ppm |

5.2. Evaluation Method:

The taste profile evaluation was carried out the procedure as follows:

I. The components where mixed and then dissolved in aqueous citric acid (pH 3.8) with ultrasound at room temperature and equilibrated for 30 minutes.

II. Panel: 8 persons

III. Method: For the sweetness evaluation of each sample, the sample was tested in pairs with several sugar solutions of given sweetness, such as 5%, 6%, 7%, 8%, 9%, or 10% as standard reference samples. The sweetness of each sample was compared with those of the reference sugar solutions, and the sweetness was evaluated and recorded according to the judgment that the sweetness of the sample was similar to a specific sugar solution or between specific sugar solutions. The results were recorded as the mean value of the results provided by the panel.

For evaluation of taste profile, the samples were tested and were scored 0-5 according to the increased sugar likeness, bitterness, aftertaste and lingering taste profiles. The results were recorded as the mean value of the results provided by the panels.

5.3 Results

The taste profile of RA98/GMG composition is shown in Table 9.

Results were as follow:

TABLE 9

| Sample No. | RA98 | GMG-V20L | GMG-V40 | GMG-V60 | SE | Sugar like | Bitterness | Aftertaste | Lingering |
|---|---|---|---|---|---|---|---|---|---|
| 201 | 300 ppm | — | — | — | 7% | 3 | 2 | 3 | 4 |
| 427 | 300 ppm | 100 ppm | — | — | 7.5% | 3.5 | 0.5 | 2 | 3 |
| 101 | 300 ppm | 200 ppm | — | — | 7.5% | 3.5 | 0.5 | 1 | 2 |
| 624 | 300 ppm | 300 ppm | — | — | 7.8% | 4 | 0.5 | 0.5 | 1.5 |
| 610 | 300 ppm | — | 100 ppm | — | 7.8% | 3.5 | 0.5 | 1 | 2 |
| 410 | 300 ppm | — | 200 ppm | — | 8% | 3.5 | 0.5 | 1.5 | 2 |
| 206 | 300 ppm | — | 300 ppm | — | 8% | 4 | 0 | 0.5 | 1 |
| 529 | 300 ppm | — | — | 100 ppm | 7.8% | 4 | 0 | 0.5 | 1 |
| 065 | 300 ppm | — | — | 200 ppm | 7.8% | 4 | 0 | 0.5 | 1 |
| 113 | 300 ppm | — | — | 300 ppm | 8% | 4 | 0 | 1 | 1 |

5.4. Discussion

The synergistic effects are shown in Table 10.

TABLE 10

| GMG | Concentration of GMG | Concentration of RA98 | SE | Increased SE by GMG | sweetness (ppm sugar) of GMG per ppm* |
|---|---|---|---|---|---|
| RA98 | | 300 ppm | 7% | — | — |
| GMG-V20L | 100 ppm | 300 ppm | 7.5% | 0.5% | 50 |
| | 200 ppm | 300 ppm | 7.5% | 0.5% | 25 |
| | 300 ppm | 300 ppm | 7.8% | 0.8% | 26.7 |
| GMG-V40 | 100 ppm | 300 ppm | 7.8% | 0.8% | 80 |
| | 200 ppm | 300 ppm | 8% | 1% | 50 |
| | 300 ppm | 300 ppm | 8% | 1% | 33.3 |
| GMG-V60 | 100 ppm | 300 ppm | 7.8% | 0.8% | 80 |
| | 200 ppm | 300 ppm | 7.8% | 0.8% | 40 |
| | 300 ppm | 300 ppm | 8% | 1% | 33.3 |

*sweetness (ppm sugar) of GMG per ppm = (Measured SE − SE of RA98)/concentration of GMG With regard to the synergistic effect, it was found when the concentration of CMG is below 300 ppm, no sweetness was noted, but as the concentration was increased, it increased the sweetness potency of RA98. The results are an increase in 0.5%-1% SE. This result means that GMG has a synergistic effect with RA98.

The mouth feel of RA98 was also improved by GMG. The bitter taste, after taste (metallic and licorice tastes) and sweetness lingering was reduced or eliminated.

Example 6

Synergistic taste effects of GMG to RA/RB composition and effect of GMG to RA/RB/RD composition 6.1 Conditions The samples were tested in aqueous solution of citric acid at pH 3.8.

The concentration by weight of the samples used in the test are shown in Tables 11 and 11':

TABLE 11

| Sample No. | RA/RB composition | GMG-V20L | GMG-V40 | GMG-V60 |
|---|---|---|---|---|
| 425 | 250 ppm | — | — | — |
| 899 | 250 ppm | 200 ppm | — | — |
| 181 | 250 ppm | — | 200 ppm | — |
| 317 | 250 ppm | — | — | 200 ppm |

The composition of RA/RB was as follows:

| | RA | RD | RB | RC | STV |
|---|---|---|---|---|---|
| RA/RB | 77.46% | — | 16.45% | — | 0.45% |

TABLE 11'

| Sample No. | RA/RB/RD composition | GMG-V20L | GMG-V40 | GMG-V60 |
|---|---|---|---|---|
| 350 | 250 ppm | — | — | — |
| 509 | 250 ppm | 200 ppm | — | — |

TABLE 11'-continued

| Sample No. | RA/RB/RD composition | GMG-V20L | GMG-V40 | GMG-V60 |
|---|---|---|---|---|
| 815 | 250 ppm | — | 200 ppm | — |
| 926 | 250 ppm | — | — | 200 ppm |

The composition of RA/RB/RD was as follows:

|  | RA | RD | RB | RC | STV |
|---|---|---|---|---|---|
| RA/RB/RD | 77.0% | 6.0% | 11.0% | — | — |

Evaluation Method:

The panel composition, the method of sample preparation and the method of taste evaluation were all same as described in Example 5.

Results

The taste profiles of RA/RB or RA/RB/RD composition blend with GMG are shown in Tables 12 and 12'.

TABLE 12

| Sample No. | RA/RB composition | GMG-V20L | GMG-V40 | GMG-V60 | SE | Sugar like | Bitterness | Aftertaste | Lingering |
|---|---|---|---|---|---|---|---|---|---|
| 425 | 250 ppm | — | — | — | 5% | 4 | 0 | 1 | 2 |
| 899 | 250 ppm | 200 ppm | — | — | 6.5% | 4.5 | 0 | 0.5 | 1 |
| 181 | 250 ppm | — | 200 ppm | — | 7% | 4.5 | 0 | 0.5 | 1 |
| 317 | 250 ppm | — | — | 200 ppm | 7.5% | 4 | 0 | 0.5 | 1 |

TABLE 12'

| Sample No. | RA/RB/RD composition | GMG-V20L | GMG-V40 | GMG-V60 | SE | Sugar like | Bitterness | Aftertaste | Lingering |
|---|---|---|---|---|---|---|---|---|---|
| 350 | 250 ppm | — | — | — | 6.3% | 4.5 | 0 | 0 | 0.5 |
| 509 | 250 ppm | 200 ppm | — | — | 7% | 4.5 | 0 | 0.5 | 0.5 |
| 815 | 250 ppm | — | 200 ppm | — | 7.5% | 4.5 | 0 | 0.5 | 1 |
| 926 | 250 ppm | — | — | 200 ppm | 8% | 4.5 | 0 | 0.5 | 0.5 |

Discussion

The synergistic effects are shown in Tables 13 and 13'.

TABLE 13

| GMG | Concentration of GMG | Concentration of RA/RB composition | SE | Increased SE by GMG | sweetness (ppm sugar) of GMG per ppm* |
|---|---|---|---|---|---|
| RA/RB composition |  | 250 ppm | 5% | — | — |
| GMG-V20L | 200 ppm | 250 ppm | 6.5% | 1.5% | 75 |
| GMG-V40 | 200 ppm | 250 ppm | 7% | 2% | 100 |
| GMG-V60 | 200 ppm | 250 ppm | 7.5% | 2.5% | 125 |

*sweetness (ppm sugar) of GMG per ppm = (Measured SE − SE of RA/RB composition)/concentration of GMG With regard to the synergistic effect, it was found that although the concentration of GMG at 200 ppm, where the concentration had no sweetness, it increased the sweet potency of RA/RB composition. It added 1.5%-2.5% SE. That result means that GMG has a synergistic effect with RA/RB composition.

Additionally, the mouth feel of RA97 can be improved by GMG. The aftertaste (such as metallic taste) and sweetness lingering was reduced.

TABLE 13'

| GMG | Concentration of GMG | Concentration of RA/RB composition | SE | Increased SE by GMG | sweetness (ppm sugar) of GMG per ppm* |
|---|---|---|---|---|---|
| RA/RB/RD composition | | 250 ppm | 6.3% | — | — |
| GMG-V20L | 200 ppm | 250 ppm | 7% | 0.7% | 15.6 |
| GMG-V40 | 200 ppm | 250 ppm | 7.5% | 1.2% | 26.7 |
| GMG-V60 | 200 ppm | 250 ppm | 8% | 1.7% | 37.8 |

*sweetness (ppm sugar) of GMG per ppm = (Measured SE – SE of RA/RB/RD composition)/concentration of GMG With regard to the synergistic effect, it was found that although the concentration of GMG at 200 ppm, where the concentration had no sweetness, it increased the sweet potency of RA/RB/RD composition. It added 0.7%-1.7% SE. That result means that GMG has a synergistic effect with RA/RB/RD composition.

Example 7

Synergistic taste effects of GMG and GSG blend to RA/RB blend or RA

Conditions

The samples were prepared in aqueous solution of citric acid at pH 3.8.

The concentration by weight of all samples used in the tests were as shown as Tables 14, 14', 14", 14"' and 14"".

TABLE 14

| Sample No. | RA/RB composition | GMG-V20L | GMG-V40 | GMG-RA60 | GSG-RA20 |
|---|---|---|---|---|---|
| 425 | 250 ppm | — | — | — | — |
| 266 | 250 ppm | 200 ppm | — | — | 200 ppm |
| 647 | 250 ppm | — | 200 ppm | — | 200 ppm |
| 505 | 250 ppm | — | — | 200 ppm | 200 ppm |

The composition of RA/RB is as same as that of Example 6.

TABLE 14'

| Sample No. | RA98 | GMG-V20L | GMG-V40 | GMG-RA60 | GSG-RA20 |
|---|---|---|---|---|---|
| 298 | 300 ppm | — | — | — | — |
| 405 | 300 ppm | 200 ppm | — | — | 170 ppm |
| 380 | 300 ppm | — | 200 ppm | — | 170 ppm |
| 677 | 300 ppm | — | — | 200 ppm | 170 ppm |

The RA98 is as same as that of Example 5.

TABLE 14"

| Sample No. | RA98 | GMG-V20L | GMG-V40 | GMG-RA60 | GSG-RA50 |
|---|---|---|---|---|---|
| 856 | 300 ppm | — | — | — | — |
| 957 | 300 ppm | 200 ppm | — | — | 170 ppm |
| 135 | 300 ppm | — | 200 ppm | — | 170 ppm |
| 408 | 300 ppm | — | — | 200 ppm | 170 ppm |

The RA98 is as same as that of Example 5

TABLE 14'''

| Sample No. | RA98 | GMG-V20L | GMG-V40 | GMG-RA60 | GSG-RA80 |
|---|---|---|---|---|---|
| 328 | 300 ppm | — | — | — | — |
| 677 | 300 ppm | 200 ppm | — | — | 170 ppm |
| 509 | 300 ppm | — | 200 ppm | — | 170 ppm |
| 115 | 300 ppm | — | — | 200 ppm | 170 ppm |

The RA98 is as same as that of Example 5

TABLE 14""

| Sample No. | RA/RB/RD composition | GMG-V20L | GMG-V40 | GMG-RA60 | GSG-RA20 |
|---|---|---|---|---|---|
| 133 | 300 ppm | — | — | — | — |
| 815 | 300 ppm | 200 ppm | — | — | 170 ppm |
| 509 | 300 ppm | — | 200 ppm | — | 170 ppm |
| 408 | 300 ppm | — | — | 200 ppm | 170 ppm |

The RA/RB/RD composition is as same as that in Example 6.

Evaluation Method:

The panel composition, the method of sample preparation and the method of taste evaluation were all as described in Example 5.

Results

The taste profiles of GMG/GSG/(RA/RB) composition or GMGMGSG/RA composition are shown in Tables 15, 15', 15", 15"' and 15"".

TABLE 15

| Sample No. | RA/RB composition | GMG-V20L | GMG-V40 | GSG-RA60 | GSG-RA20 | SE | Sugar like | Bitterness | Aftertaste | Lingering |
|---|---|---|---|---|---|---|---|---|---|---|
| 425 | 250 ppm | — | — | — | — | 5% | 4 | 0 | 1 | 2 |
| 266 | 250 ppm | 200 ppm | — | — | 200 ppm | 7.8% | 4 | 0.5 | 1 | 1 |
| 647 | 250 ppm | — | 200 ppm | — | 200 ppm | 8.5% | 4 | 0.5 | 1 | 1 |
| 505 | 250 ppm | — | — | 200 ppm | 200 ppm | 8.5% | 4 | 0.5 | 1 | 1 |

TABLE 15'

| Sample No. | RA98 | GMG-V20L | GMG-V40 | GSG-RA60 | GSG-RA20 | SE | Sugar like | Bitterness | Aftertaste | Lingering |
|---|---|---|---|---|---|---|---|---|---|---|
| 298 | 300 ppm | — | — | — | — | 7% | 3 | 2 | 3 | 4 |
| 405 | 300 ppm | 200 ppm | — | — | 170 ppm | 7.5% | 3.5 | 0.5 | 1.5 | 1.5 |
| 380 | 300 ppm | — | 200 ppm | — | 170 ppm | 8.5% | 3.5 | 0.5 | 1.5 | 1.5 |
| 677 | 300 ppm | — | — | 200 ppm | 170 ppm | 9% | 4 | 0.5 | 1.5 | 1.5 |

TABLE 15"

| Sample No. | RA98 | GMG-V20L | GMG-V40 | GSG-RA60 | GSG-RA50 | SE | Sugar like | Bitterness | Aftertaste | Lingering |
|---|---|---|---|---|---|---|---|---|---|---|
| 856 | 300 ppm | — | — | — | — | 7% | 3 | 2 | 3 | 4 |
| 957 | 300 ppm | 200 ppm | — | — | 170 ppm | 7.8% | 4.5 | 0 | 1 | 1 |
| 135 | 300 ppm | — | 200 ppm | — | 170 ppm | 8.5% | 4 | 0.5 | 1.5 | 1 |
| 408 | 300 ppm | — | — | 200 ppm | 170 ppm | 8% | 4 | 0 | 1 | 1 |

TABLE 15'''

| Sample No. | RA98 | GMG-V20L | GMG-V40 | GSG-RA60 | GSG-RA80 | SE | Sugar like | Bitterness | Aftertaste | Lingering |
|---|---|---|---|---|---|---|---|---|---|---|
| 328 | 300 ppm | — | — | — | — | 7% | 3 | 2 | 3 | 4 |
| 677 | 300 ppm | 200 ppm | — | — | 170 ppm | 8% | 4.5 | 0 | 0.5 | 0.5 |
| 509 | 300 ppm | — | 200 ppm | — | 170 ppm | 8.5% | 4.5 | 0 | 0.5 | 0.5 |
| 115 | 300 ppm | — | — | 200 ppm | 170 ppm | 8.8% | 4 | 0 | 1 | 1 |

TABLE 15""

| Sample No. | RA/RB/RD composition | GMG-V20L | GMG-V40 | GSG-RA60 | GSG-RA20 | SE | Sugar like | Bitterness | Aftertaste | Lingering |
|---|---|---|---|---|---|---|---|---|---|---|
| 133 | 300 ppm | — | — | — | — | 7.5% | 4.5 | 0 | 0 | 0.5 |
| 815 | 300 ppm | 200 ppm | — | — | 170 ppm | 9.3% | 4.5 | 0 | 0.5 | 0.5 |
| 509 | 300 ppm | — | 200 ppm | — | 170 ppm | 9% | 4 | 0 | 1 | 1 |
| 408 | 300 ppm | — | — | 200 ppm | 170 ppm | 9.5% | 4 | 0 | 0.5 | 1 |

Discussion

The synergistic effects are shown in Tables 16, 16', 16", 16''' and 16''''.

TABLE 16

| GMG | Concentration of GMG | Concentration of GSG-RA20 | Concentration of RA/RB composition | SE | Increased SE by GMG + GSG | sweetness (ppm sugar) of GMG + GSG per ppm* |
|---|---|---|---|---|---|---|
| RA/RB composition | — | — | 250 ppm | 5% | — | — |
| GMG-V20L | 200 ppm | 200 ppm | 250 ppm | 7.8% | 2.8% | 140 |
| GMG-V40 | 200 ppm | 200 ppm | 250 ppm | 8.5% | 3.5% | 175 |
| GMG-V60 | 200 ppm | 200 ppm | 250 ppm | 8.5% | 3.5% | 175 |

*sweetness (ppm sugar) of GMG + GSG per ppm = (Measured SE-SE of RA/RB composition)/concentration of GMG + GSG With regard to the synergistic effects, it was found that although the concentration of GNIGH-GSG at 400 ppm has very low or almost no sweetness, it increased the sweetness potency of the RA/RB composition. The combination added 3%-3.5% SE over that of RA/RB alone. That means GMG+GSG has synergistic effect with RA/RB composition.

TABLE 16'

| GMG | Concentration of GMG | Concentration of GSG-RA20 | Concentration of RA98 | SE | Increased SE by GMG + GSG | sweetness (ppm sugar) of GMG + GSG per ppm* |
|---|---|---|---|---|---|---|
| RA98 | — | — | 300 ppm | 7% | — | — |
| GMG-V20L | 200 ppm | 170 ppm | 300 ppm | 7.5% | 0.5% | 13.5 |
| GMG-V40 | 200 ppm | 170 ppm | 300 ppm | 8.5% | 1.5% | 40.5 |
| GMG-V60 | 200 ppm | 170 ppm | 300 ppm | 9% | 2.0% | 54 |

*sweetness (ppm sugar) of GMG + GSG per ppm = (Measured SE-SE of RA98)/concentration of GMG + GSG With regard to the synergistic effects, it was found that although the concentration of GMG+GSG at 370 ppm has very low or almost no sweetness, it increased the sweetness potency of the RA98. The combination added 0.5%-2% SE over that of RA98 alone. That means GMG+GSG has synergistic effect with RA98.

The mouth feel of RA98 was also improved by GMG+GSG. The bitter taste, after taste (metallic and licorice tastes) and sweetness lingering was reduced or eliminated.

TABLE 16"

| GMG | Concentration of GMG | Concentration of GSG-RA50 | Concentration of RA98 | SE | Increased SE by GMG + GSG | sweetness (ppm sugar) of GMG + GSG per ppm* |
|---|---|---|---|---|---|---|
| RA98 | — | — | 300 ppm | 7% | — | — |
| GMG-V20L | 200 ppm | 170 ppm | 300 ppm | 7.8% | 0.8% | 21.6 |
| GMG-V40 | 200 ppm | 170 ppm | 300 ppm | 8.5% | 1.5% | 40.5 |
| GMG-60 | 200 ppm | 170 ppm | 300 ppm | 8% | 1.0% | 27 |

*sweetness (ppm sugar) of GMG + GSG per ppm = (Measured SE-SE of RA98)/concentration of GMG + GSG With regard to the synergistic effects, it was found that although the concentration of GMG+GSG at 370 ppm has very low or almost no sweetness, it increased the sweetness potency of the RA98. The combination added 0.8%-1.5% SE, over that of RA98 alone. That means GMG+GSG has synergistic effect with RA98.

The mouth feel of RA98 was also improved by GMG+GSG. The bitter taste, after taste (metallic and licorice tastes) and sweetness lingering was reduced or eliminated.

TABLE 16'''

| GMG | Concentration of GMG | Concentration of GSG-RA80 | Concentration of RA98 | SE | Increased SE by GMG + GSG | sweetness (ppm sugar) of GMG + GSG per ppm* |
|---|---|---|---|---|---|---|
| RA98 | — | — | 300 ppm | 7% | — | — |
| GMG-V20L | 200 ppm | 170 ppm | 300 ppm | 8% | 1% | 27 |
| GMG-V40 | 200 ppm | 170 ppm | 300 ppm | 8.5% | 1.5% | 40.5 |
| GMG-V60 | 200 ppm | 170 ppm | 300 ppm | 8.8% | 1.8% | 48.6 |

*sweetness (ppm sugar) of GMG + GSG per ppm = (Measured SE-SE of RA98)/concentration of GMG + GSG With regard to the synergistic effects, it was found that although the concentration of GMG+GSG at 370 ppm has very low or almost no sweetness, it increased the sweetness potency of the RA98. The combination added 1%-1.8% SE over that of RA98 alone. That means GMG+GSG has synergistic effect with RA98.

The mouth feel of RA98 was also improved by GMG+GSG. The bitter taste, after taste (metallic and licorice tastes) and sweetness lingering was reduced or eliminated.

TABLE 16''''

| GMG | Concentration of GMG | Concentration of GSG-RA20 | Concentration of RA/RB/RD composition | SE | Increased SE by GMG + GSG | sweetness (ppm sugar) of GMG + GSG per ppm* |
|---|---|---|---|---|---|---|
| RA/RB/RD composition | — | — | 300 ppm | 7.5% | — | — |
| GMG-V20L | 200 ppm | 170 ppm | 300 ppm | 9.3% | 1.8% | 48.6 |
| GMG-V40 | 200 ppm | 170 ppm | 300 ppm | 9% | 1.5% | 40.5 |
| GMG-V60 | 200 ppm | 170 ppm | 300 ppm | 9.5% | 2.0% | 54 |

*sweetness (ppm sugar) of GMG + GSG per ppm = (Measured SE-SE of RA/RB/RD composition)/concentration of GMG + GSG With regard to the synergistic effects, it was found that although the concentration of GMG+GSG at 370 ppm has very low or almost no sweetness, it increased the sweetness potency of the RA/RB/RD composition. The combination added 1.5%-2% SE over that of RA/RB/RD composition alone. That means GMG-F-GSG has synergistic effect with RA/RB/RD composition Example 8

Synergistic taste effects of MGV and GSG blends in comparison to sugar

Conditions

The samples were prepared in aqueous solution of citric acid at pH 3.8.

The concentration by weight of the samples used in the tests were shown as Tables 17, 17' and 17":

TABLE 17

| Sample No. | Sugar | MGV20 | GSG-RA20 |
|---|---|---|---|
| 171 | 5% | 50 ppm | 200 ppm |
| 263 | 5% | 100 ppm | 200 ppm |
| 548 | 5% | 150 ppm | 200 ppm |
| 311 | 5% | 200 ppm | 200 ppm |

TABLE 17'

| Sample No. | Sugar | MGV20 | GSG-RA50 |
|---|---|---|---|
| 815 | 5% | 50 ppm | 170 ppm |
| 405 | 5% | 100 ppm | 170 ppm |
| 380 | 5% | 150 ppm | 170 ppm |
| 677 | 5% | 200 ppm | 170 ppm |

TABLE 17"

| Sample No. | Sugar | MGV20 | GSG-RA80 |
|---|---|---|---|
| 408 | 5% | 50 ppm | 170 ppm |
| 926 | 5% | 100 ppm | 170 ppm |
| 215 | 5% | 150 ppm | 170 ppm |
| 509 | 5% | 200 ppm | 170 ppm |

Evaluation Method:

The panel composition, the method of sample preparation and the method of taste evaluation were as described in Example 3.

Results

The taste profiles of Sugar/MGV20/GSG compositions are shown in Tables 18, 18' and 18".

TABLE 18

| Sample No. | Sugar | MGV20 | GSG-RA20 | SE | Taste profile |
|---|---|---|---|---|---|
| 171 | 5% | 50 ppm | 200 ppm | 10% | Very sugar-like |
| 263 | 5% | 100 ppm | 200 ppm | 10% | Very sugar-like |
| 548 | 5% | 150 ppm | 200 ppm | 10.5% | Very sugar-like |
| 311 | 5% | 200 ppm | 200 ppm | 10.5% | Very sugar-like |

TABLE 18'

| Sample No. | Sugar | MGV20 | GSG-RA50 | SE | Taste profile |
|---|---|---|---|---|---|
| 815 | 5% | 50 ppm | 170 ppm | 9.5% | Very sugar-like |
| 405 | 5% | 100 ppm | 170 ppm | 10.5% | Very sugar-like |
| 380 | 5% | 150 ppm | 170 ppm | 10.5% | Very sugar-like |
| 677 | 5% | 200 ppm | 170 ppm | 11% | Very sugar-like |

TABLE 18"

| Sample No. | Sugar | MGV20 | GSG-RA80 | SE | Taste profile |
|---|---|---|---|---|---|
| 408 | 5% | 50 ppm | 170 ppm | 10% | Very sugar-like |
| 926 | 5% | 100 ppm | 170 ppm | 10% | Very sugar-like |
| 215 | 5% | 150 ppm | 170 ppm | 10.5% | Very sugar-like |
| 509 | 5% | 200 ppm | 170 ppm | 10.5% | Very sugar-like |

Discussion

The synergistic effects are shown in Tables 19, 19' and 19".

TABLE 19

| Concentration of MGV20 | Concentration of GSG-RA20 | Concentration of sugar | SE | Increased SE by MGV20 + GSG | sweetness (ppm sugar) of MGV20 + GSG per ppm* |
|---|---|---|---|---|---|
| 50 ppm | 200 ppm | 5% | 10% | 5% | 250 |
| 100 ppm | 200 ppm | 5% | 10% | 5% | 250 |
| 150 ppm | 200 ppm | 5% | 10.5% | 5.5% | 275 |
| 200 ppm | 200 ppm | 5% | 10.5% | 5.5% | 275 |

*sweetness (ppm sugar) of MGV20 + GSG per ppm = (Measured SE − Concentration of sugar)/concentration of MGV20 + GSG With regard to synergistic effects, it was found that although the concentration of MGV20+GSG below 400 ppm had very low or almost no sweetness, it increased the sweet potency of sugar. The combination added 5%-5.5% SE without any change in taste. The results mean that MGV20+GSG has a synergistic effect with sugar.

TABLE 19'

| Concentration of MGV20 | Concentration of GSG-RA50 | Concentration of sugar | SE | Increased SE by MGV20 + GSG | sweetness (ppm sugar) of MGV20 + GSG per ppm* |
|---|---|---|---|---|---|
| 50 ppm | 170 ppm | 5% | 9.5% | 4.5% | 204.5 |
| 100 ppm | 170 ppm | 5% | 10.5% | 5.5% | 203.7 |
| 150 ppm | 170 ppm | 5% | 10.5% | 5.5% | 171.9 |
| 200 ppm | 170 ppm | 5% | 11% | 6% | 162.2 |

*sweetness (ppm sugar) of MGV20 + GSG per ppm = (Measured SE − Concentration of sugar)/concentration of MGV20 + GSG With regard to synergistic effects, it was found that although the concentration of MGV20+GSG below 370 ppm had very low or almost no sweetness, it increased the sweet potency of sugar. The combination added 4.5%-6% SE without any change in taste. The results mean that MGV20+GSG has a synergistic effect with sugar.

TABLE 19"

| Concentration of MGV20 | Concentration of GSG-RA80 | Concentration of sugar | SE | Increased SE by MGV20 + GSG | sweetness (ppm sugar) of MGV20 + GSG per ppm* |
|---|---|---|---|---|---|
| 50 ppm | 170 ppm | 5% | 10% | 5% | 227.3 |
| 100 ppm | 170 ppm | 5% | 10% | 5% | 185.2 |
| 150 ppm | 170 ppm | 5% | 10.5% | 5.5% | 171.9 |
| 200 ppm | 170 ppm | 5% | 10.5% | 5.5% | 148.6 |

*sweetness (ppm sugar) of MGV20 + GSG per ppm = (Measured SE − Concentration of sugar)/concentration of MGV20 + GSG With regard to synergistic effects, it was found that although the concentration of MGV20+GSG below 370 ppm had very low or almost no sweetness, it increased the sweet potency of sugar. The combination added 5%-5.5% SE without any change in taste. The results mean that MGV20+GSG has a synergistic effect with sugar.

Example 9

Synergistic Taste Effects of GMG with MGV
Conditions

The samples were prepared in an aqueous solution of citric acid at pH 3.8.

The concentration by weight of all samples used in the test were shown as Table 20:

TABLE 20

| Sample No. | GMG-V20S | MGV60 |
|---|---|---|
| 500 | — | 500 ppm |
| 400 | — | 400 ppm |
| 300 | — | 300 ppm |
| 180 | 100 ppm | 400 ppm |
| 073 | 200 ppm | 300 ppm |

Evaluation Method:

The panel composition, method of sample preparation and method of taste evaluation were as described in Example 3.

Results

The taste profile of MGV20/GSG composition is shown in Table 21.

TABLE 21

| Sample No. | GMG-V20S | MGV60 | SE | Taste profile |
|---|---|---|---|---|
| 500 | — | 500 ppm | 7.8% | A little bitter aftertaste, licorice, sweet lingering |
| 400 | — | 400 ppm | 6.5% | A little bitter aftertaste, licorice, sweet lingering |
| 300 | — | 300 ppm | 5.5% | Licorice, sweet lingering |
| 180 | 100 ppm | 400 ppm | 7.8% | Smooth mouth feel, like-sugar, no bitterness, reduced sweet lingering |
| 073 | 200 ppm | 300 ppm | 7.5% | Smooth mouth feel, like-sugar, no bitterness, reduced sweet lingering |

Discussion

The synergistic effects are shown in Table 22.

TABLE 22

| Concentration of GMG-V20S | Concentration of MGV60 | SE | Increased SE by GMG-V20S | sweetness (ppm sugar) of GMG-V20S per ppm* |
|---|---|---|---|---|
| — | 400 ppm | 6.5% | — | — |
| — | 300 ppm | 5.5% | — | — |
| 100 ppm | 400 ppm | 7.8% | 1.3% | 130 |
| 200 ppm | 300 ppm | 7.5% | 2% | 100 |

*sweetness (ppm sugar) of GMG-V20S per ppm = (Measured SE − SE of MGV60)/concentration of GMG-V20S With regard to synergistic effects, it was found that although the concentration of GMG-V20 below 200 ppm has very low or almost no sweetness, it increased the sweetness potency of MGV60, especially when the concentration of MGV60 was 300 ppm-400 ppm. This combination added 1%-2% SE. This results means that GMG-V20 has a synergistic effect with MGV60.

The mouth feel of MGV60 was improved by CMG, The aftertaste (like bitterness and licorice taste) and sweetness lingering, the mouth feel of MGV60 was improved by GMG and was reduced, That means that when blending, the glycosylated product of low content MGV can replace part of the content of MGV.

Synergistic Taste Effects of GMG and GSG Blend with MGV
Conditions

The samples were prepared in an aqueous solution of citric acid at pH 3.8.

The concentration by weight of all samples used in the test were shown as Table 23:

TABLE 23

| Sample No. | MGV60 | GMG-V20L | GSG-RA20 |
|---|---|---|---|
| 092 | 200 ppm | — | — |
| 361 | 300 ppm | — | — |
| 748 | 400 ppm | — | — |
| 509 | 200 ppm | 200 ppm | 170 ppm |
| 957 | 300 ppm | 200 ppm | 170 ppm |
| 135 | 400 ppm | 200 ppm | 170 ppm |

The MGV60 is as described in Example 9.

Evaluation Method:

The panel composition, method of sample preparation and method of taste evaluation were as described in Example 3.

Results

The taste profile of GMG/GSG/MGV composition is shown in Table 24.

TABLE 24

| Sample No. | MGV60 | GMG-V20L | GSG-RA20 | SE | Taste profile |
|---|---|---|---|---|---|
| 092 | 200 ppm | — | — | 4.3% | Licorice, sweet lingering |
| 361 | 300 ppm | — | — | 5.5% | Licorice, sweet lingering |
| 748 | 400 ppm | — | — | 6.5% | A little bitter aftertaste, licorice, sweet lingering |
| 509 | 200 ppm | 200 ppm | 170 ppm | 6% | Smooth mouth feel, like-sugar, no bitterness, reduced sweet lingering |
| 957 | 300 ppm | 200 ppm | 170 ppm | 6.5% | Smooth mouth feel, like-sugar, no bitterness, reduced sweet lingering |
| 135 | 400 ppm | 200 ppm | 170 ppm | 8.5% | Smooth mouth feel, like-sugar, no bitterness, reduced sweet lingering |

Discussion
The synergistic effects are shown in Table 25.

TABLE 25

| Concentration of MGV60 | Concentration of GMG-V20L | Concentration of GSG-RA20 | SE | Increased SE by GMG + GSG | sweetness (ppm sugar) of GMG + GSG per ppm* |
|---|---|---|---|---|---|
| 200 ppm | — | — | 4.3% | — | — |
| 200 ppm | 200 ppm | 170 ppm | 6% | 1.7% | 45.9 |
| 300 ppm | — | — | 5.5% | — | — |
| 300 ppm | 200 ppm | 170 ppm | 6.5% | 1% | 27 |
| 400 ppm | — | — | 6.5% | — | — |
| 400 ppm | 200 ppm | 170 ppm | 8.5% | 2% | 54.1 | sweetness (ppm sugar) of GMG + GSG per ppm = (Measured SE – SE of MGV60)/concentration of GMG + GSG With regard to the synergistic effects, it was found that although the concentration of GMG+GSG at 370 ppm has very low or almost no sweetness, it increased the sweetness potency of the MGV60. The combination added 1%-2% SE over that of MGV60 alone. That means GMG+GSG has synergistic effect with MGV60.

The mouth feel of MGV60 was improved by GMG+GSG. The aftertaste (like bitterness and licorice taste) and sweetness lingering, the mouth feel of MGV60 was improved by GMG+GSG and was reduced. That means that when blending, the glycosylated product of low content MGV plus GSG can replace part of the content of MGV.

The combination of a MG and a sweet-tasting protein (a composition comprising a mogroside or a swingle extract and a sweet-tasting protein)

Conditions

The content of thaumatin sample is 10% (a blend of thaumatin with gum Arabic such that the weight percent of the thaumatin is 10%. This composition is used throughout the following examples.). The samples used are known by the commercial name as Talin, which is available from Naturex.

The samples were tested in aqueous solution of citric acid at pH3.8.

The samples were as follows:

| Sample No. | MGV20 | MGV50 | Thaumatin 10% |
|---|---|---|---|
| 297 | 500 ppm | | |
| 507 | 500 ppm | | 10 ppm |
| 108 | | 500 ppm | |
| 329 | | 500 ppm | 10 ppm |

Results

| Sample No. | MGV20 | MGV50 | Thaumatin 10% | SE | Taste profile |
|---|---|---|---|---|---|
| 297 | 500 ppm | | | 3.5% | Bitter and licorice aftertaste |
| 507 | 500 ppm | | 10 ppm | 6.0% | Very sugar-like |
| 108 | | 500 ppm | | 5.0% | Obvious bitter and licorice aftertaste |
| 329 | | 500 ppm | 10 ppm | 7.0% | Very sugar-like |

Discussion

As for the synergistic effect, it can be found that although the concentration of thaumatin 10% is 10 ppm, at which concentration there is considered no sweetness by itself, it increases the sweetness potency of MGV. The combination of and thaumatin adds 2%-2.5% SE over that of MGV samples without thaumatin. At the same time, the taste profile of MGV can be improved by inclusion of thaumatin. Thaumatin is listed in FEMA GRAS 28 as FEMA No. 3732. Average maximum use of thaumatin in FEMA GRAS is 7 ppm. 10 ppm of 10% thaumatin provides 1 ppm of thaumatin in a sample solution. Thautnatin at a 1 ppm level imparts no sweetness to a composition.

The combination of an MG, a sweet-tasting protein and sugar. composition comprising a mogroside or a swingle extract, a sweet-tasting protein and at least one non-mogroside based sweetener, a non-swingle based sweetener or a non-stevia based sweetener).

Conditions

The content of thaumatin sample is 10%. The samples used are known by the commercial name as Talin, which is available from Naturex.

The samples were tested in aqueous solution of citric acid at pH 3.8.

The samples were as follows:

| Sample No. | MGV20 | Thaumatin 10% | sugar |
|---|---|---|---|
| 425 | 100 ppm | 10 ppm | |
| 051 | 100 ppm | 10 ppm | 5% |
| 700 | 150 ppm | 10 ppm | |
| 263 | 150 ppm | 10 ppm | 5% |

Results

| Sample No. | MGV20 | Thaumatin 10% | sugar | SE | Taste profile |
|---|---|---|---|---|---|
| 425 | 100 ppm | 10 ppm | | | Almost no sweetness |
| 051 | 100 ppm | 10 ppm | 5% | 8.0% | Very sugar-like |
| 700 | 150 ppm | 10 ppm | | | Almost no sweetness |
| 263 | 150 ppm | 10 ppm | 5% | 8.5% | Very sugar-like |

Discussion

As for the synergistic effect, it can be found that although the concentration of MGV20 plus thaumatin is below 200 ppm, at which concentration the composition has very low or almost no sweetness, it increases the sweet potency of sugar. The combination of MGV and thaumatin with the sugar can add 3-3.5% SE without any change in taste. That means MGV20 in combination with thaumatin has a synergistic effect with sugar. The sweetness threshold of MGV20 is 200 ppm (refer to example 2). The sweetness threshold for pure thaumatin is 7 ppm. In this example the level of MGV20 and thaumatin are below their sweetness detectable levels.

The combination of a MG, a GSG, a sweet-tasting protein and sugar (A composition comprising a mogroside or a swingle extract, a glycosylated steviol glycoside or a glycosylated stevia extract, a sweet-tasting protein and at least one non-mogroside based sweetener, a non-swingle based sweetener or a non-stevia based sweetener)

The content of thaumatin sample is 10%. The samples used are known by the commercial name as Talin, which is available from Naturex.

The samples were tested in aqueous solution of citric acid at pH 3.8.

The samples were as follows:

| Sample No. | MGV20 | GSG-RA20 | Thaumatin 10% | sugar |
|---|---|---|---|---|
| 114 | 100 ppm | 150 ppm | 10 ppm | |
| 625 | 200 ppm | 150 ppm | 10 ppm | |
| 831 | 100 ppm | 150 ppm | 10 ppm | 5% |
| 984 | 250 ppm | 150 ppm | 10 ppm | 5% |

Results

| Sample No. | WGV20 | GSG-RA20 | Thaumatin 10% | sugar | SE | Taste profile |
|---|---|---|---|---|---|---|
| 114 | 100 ppm | 150 ppm | 10 ppm | | | Almost no sweetness |
| 625 | 200 ppm | 150 ppm | 10 ppm | | 1.5% | Virtually no sweetness |
| 831 | 100 ppm | 150 ppm | 10 ppm | 5% | 10% | Very sugar-like |
| 984 | 250 ppm | 150 ppm | 10 ppm | 5% | 10% | Very sugar-like |

Discussion

As for the synergistic effect, it can be found that although the concentration of MGV20+GSG-RA20+thaumatin is below 450 ppm, at which concentration there is very little or almost no sweetness, it increases the sweet potency of sugar. It can add 3.5-5% SE without any change in taste. That means MGV20+GSG-RA20+thaumatin has synergistic effect with sugar. The detectable sweetness threshold of MGV20 is 200 ppm (refer to example 2). GSG-RA20 conforms to FEMA GRAS 28 (FEMA No. 4728). Maximum use level is 175 ppm. There is no detectable sweetness at 150 ppm. When sweetness is below about 2%, almost half of testers do not notice any sweetness and the other half notice a slight sweetness.

The combination of a GMG, a sweet-tasting protein and sugar (a composition comprising a glycosylated mogroside or a glycosylated swingle extract, a sweet-tasting protein and at least one non-mogroside based sweetener, a non-swingle based sweetener or a non-stevia based sweetener)

Conditions

The content of thaumatin sample is 10%. The samples used are known by the commercial name as Talin, which is available from Naturex.

The samples were tested in aqueous solution of citric acid at 3.8.

The samples were as follows:

| Sample No. | GMG-V20S | GMG-V40 | Thaumatin 10% | sugar |
|---|---|---|---|---|
| 352 | 200 ppm | — | 10 ppm | |
| 908 | — | 200 ppm | 10 ppm | |
| 488 | 200 ppm | — | 10 ppm | 5% |
| 606 | — | 200 ppm | 10 ppm | 5% |

Results

| Sample No. | GMG-V20S | GMG-V40 | Thaumatin 10% | sugar | SE | Taste profile |
|---|---|---|---|---|---|---|
| 352 | 200 ppm | — | 10 ppm | | | Almost no sweetness |
| 908 | — | 200 ppm | 10 ppm | | | Almost no sweetness |
| 488 | 200 ppm | — | 10 ppm | 5% | 7% | Very sugar-like |
| 606 | — | 200 ppm | 10 ppm | 5% | 7% | Very sugar-like |

Discussion

As for the synergistic effect, it can be found that although the concentration of GMG+thaumatin is below 250 ppm, at which concentration the composition has very low or almost no sweetness, it increases the sweet potency of sugar. It can add about 2% SE without any change in taste. That means GMG+thaumatin has synergistic effect with sugar. Detectable sweetness level thresholds for GMG-V20S and GSM-V40S are both 400 ppm so at the levels noted above, they do not impart detectable sweetness.

The combination of a GMG, a GSG, a sweet-tasting protein and sugar (a composition comprising a glycosylated mogroside or a glycosylated swingle extract, a glycosylated steviol glycoside or a glycosylated stevia extract, a sweet-tasting protein and at least one non-mogroside based sweetener, a non-swingle based sweetener or a non-stevia based sweetener)

Conditions

The content of thaumatin sample is 10%. The samples used are known by the commercial name as Talin, which is available from Naturex.

The samples were tested in aqueous solution of citric acid at

The samples were as follows:

| Sample No. | GMG-V20S | GMG-V40 | GSG-RA20 | Thaumatin 10% | sugar |
|---|---|---|---|---|---|
| 352 | 200 ppm | — | 150 ppm | 10 ppm | |
| 908 | — | 200 ppm | 150 ppm | 10 ppm | |
| 488 | 200 ppm | — | 150 ppm | 10 ppm | 5% |
| 606 | — | 200 ppm | 150 ppm | 10 ppm | 5% |

Results

| Sample No. | GMG-V20S | GMG-V40 | GSG-RA20 | Thaumatin 10% | sugar | SE | Taste profile |
|---|---|---|---|---|---|---|---|
| 352 | 200 ppm | — | 150 ppm | 10 ppm | | | Almost no sweetness |
| 908 | — | 200 ppm | 150 ppm | 10 ppm | | | 1.5% |
| 488 | 200 ppm | — | 150 ppm | 10 ppm | 5% | 10% | Very sugar-like |
| 606 | — | 200 ppm | 150 ppm | 10 ppm | 5% | 10% | Very sugar-like |

Discussion

As for the synergistic effect, it can be found that although the concentration of GMG+GSG+thaumatin is below 400 ppm, at which concentration the composition has very low or almost no sweetness, it increases the sweet potency of sugar. It can add about 3.5-5% SE without any change in taste. That means GMG+GSG+thaumatin has synergistic effect with sugar. The sweetness level thresholds for GMGV20S, GSG-RA20 and GMGV40 are above the levels used, therefore alone or in combination they imparted no sweetness to the compositions noted above.

The combination of an MG, a GMG and an SG (a composition comprising mogroside or a swingle extract, a glycosylated mogroside or a glycosylated swingle extract, a glycosylated steviol glycoside or a glycosylated stevia extract and a steviol glycoside or a stevia extract)

Conditions

The samples were tested in aqueous solution of citric acid at pH 3.8.

The samples were as follows:

| Sample No. | MGV20 | MGV50 | GMG-V20S | RA97 |
|---|---|---|---|---|
| 241 | 200 ppm | — | — | 200 ppm |
| 815 | 200 ppm | — | 200 ppm | 200 ppm |
| 698 | — | 200 ppm | — | 200 ppm |
| 338 | — | 200 ppm | 200 ppm | 200 ppm |

Results

| Sample No. | MGV20 | MGV50 | GMG-V20S | RA97 | SE | Sugar-like | Bitter | After taste | lingering |
|---|---|---|---|---|---|---|---|---|---|
| 241 | 200 ppm | — | — | 200 ppm | 5% | 3 | 2 | 2.5 | 3 |
| 815 | 200 ppm | — | 200 ppm | 200 ppm | 5.5% | 3.5 | 1 | 1 | 1.5 |
| 698 | — | 200 ppm | — | 200 ppm | 6% | 3.5 | 2.5 | 2.5 | 2.5 |
| 338 | — | 200 ppm | 200 ppm | 200 ppm | 7% | 4 | 1 | 1 | 1.5 |

Discussion

As for the synergistic effect, it can be found that although the concentration of GMG-V20S is 200 ppm, at which concentration range the composition is considered to have no sweetness, it increases the sweet potency of RA97MGV. It can add 0.5%-1% SE. That means GMG has synergistic effect with RA97+MGV.

Meanwhile, the mouth feeling of RA97+MGV can be improved by GMG. The bitter taste, after taste (like metallic and licorice taste) and sweetness lingering can be reduced or eliminated.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A method to synergistically increase sweetness potency of a non-mogroside based sweetener, comprising the step of adding to the non-mogroside based sweetener a glycosylated mogroside-containing composition to form a glycosylated mogroside-containing sweetener, wherein the glycosylated mogroside-containing composition comprises glycosylated mogroside, wherein the non-mogroside based sweetener comprises rebaudioside A, and/or sucrose, wherein the ratio of the glycosylated mogroside-containing composition to the non mogroside based sweetener is from 1:300 to about 1.6:1 on a weight basis, and wherein the glycosylated mogroside-containing sweetener has increased sucrose equivalence compared to the non-mogroside based sweetener.

2. The method of claim 1, wherein the glycosylated mogroside-containing composition further comprises thaumatin.

3. The method of claim 1, wherein the non-mogroside based sweetener comprises sucrose.

4. The method of claim 1, wherein the non-mogroside based sweetener comprises rebaudioside A.

5. The method of claim 1, wherein the glycosylated mogroside-containing composition comprises glycosylated mogroside V.

6. The method of claim 5, wherein the glycosylated mogroside V is GMG-V20L, GMG-V20S, GMG-V40, or GMG-V60.

7. The method of claim 1, wherein the glycosylated mogroside-containing composition comprises mixtures of glycosylated mogroside and glycosylated steviol glycoside.

8. The method of claim 7, wherein the glycosylated steviol glycoside comprises one or more of the glycosylation products of steviol, stevioside, steviolbioside, rebaudioside A, rebaudioside B, rebaudioside C, rebaudioside D, rebaudioside rebaudioside F, rebaudioside M, rebaudioside O rebaudioside H, rebaudioside I, rebaudioside L, rebaudioside N, rebaudioside K, rebaudioside J, rubusoside, dulcoside A and mixtures thereof.

9. The method of claim 7, wherein the glycosylated steviol glycoside is glycosylated rebaudioside A, glycosylated rebaudioside B, glycosylated rebaudioside D or combinations thereof.

10. A composition comprising rebaudioside A and a glycosylated mogroside in a total amount of 70% to 100% of the composition, wherein the glycosylated mogroside is present in the composition in a range of about 10% to about 50% wt/wt, wherein the weight ratio of glycosylated mogroside to rebaudioside A is in the range of 1:1 to 1:6, wherein sweetness potency of rebaudioside A is increased in comparison to the rebaudioside A alone.

11. The composition of claim 10, further comprising one or more of cane sugar, beet sugar, honey, sucrose, fructose, maltose, xylitol, sorbitol, dextrose, glucose, mannitol, arabinose, galactose, mannose, rhamnose, xylose, inulin, sucralose, aspartame, stevia, acesulfame-K, neotame, thaumatin, erythritol, trehalose, raffinose, cellobiose, tagatose, allulose, inulin, N—N [3 [3-hydroxy-4-methoxyphenyl)propyl]-alpha-aspartyl]-L-phenylalanine 1-methy ester, glycyrrhizin, thaumatin, monellin, and sodium cyclamate.

12. The composition of claim 10, wherein the glycosylated mogroside comprises a glycosylated mogroside II, a glycosylated mogroside III, a glycosylated mogroside IV, a glycosylated mogroside V, a glycosylated siamenoside I or a glycosylated 1 1-oxomogroside V or any combination thereof.

13. A composition comprising rebaudioside A and a combination of glycosylated mogroside and a glycosylated steviol glycoside derived from RA (GSG-RA), in a total amount of 70% to 100% of the composition, wherein the glycosylated mogroside is present in the composition in a range of about 10% to about 50% wt/wt, wherein the weight ratio of glycosylated mogroside to rebaudioside A is in the range of 1:1 to 1:6, wherein sweetness potency of rebaudioside A is increased in comparison to the rebaudioside A alone.

14. The composition of claim 13, further comprising one or more of cane sugar, beet sugar, honey, sucrose, fructose, maltose, xylitol, sorbitol dextrose, glucose, mannitol, arabinose, galactose, mannose, rhamnose, xylose, inulin, sucralose, aspartame, stevia, acesulfame-K, neotame, thaumatin, erythritol, trehalose, raffinose, cellobiose, tagatose, allulose, N—[N-[3(3-hydroxy-4-methoxyphenyl)propyl]-alpha-aspartyl]-L-phenylalanine 1-methyl ester, glycyrrhizin, thaumatin, monellin, and sodium cyclamate.

15. The composition of claim 13, wherein the glycosylated mogroside comprises a glycosylated mogroside 11, a glycosylated mogroside III, a glycosylated mogroside IV, a glycosylated mogroside V, a glycosylated siamenoside I or a glycosylated 1 1-oxomogroside V or any combination thereof.

16. The method of claim 1, wherein the glycosylated mogroside-containing sweetener has increased sugar likeness compared to the non-mogroside based sweetener.

17. The method of claim 1, wherein the glycosylated mogroside-containing composition comprises mixtures of mogroside and glycosylated mogroside.

18. The method of claim 4, wherein the glycosylated mogroside-containing composition is added at a glycosylated mogroside: steviol glycosides weight ratio of 1:1 to 1:6.

19. The method of claim 4, wherein the non-mogroside based sweet sweetener further comprises rebaudioside B and/or rebaudioside D.

20. The method of claim 1, wherein the step of addition causes a synergistic increase in the sucrose equivalence of the glycosylated mogroside-containing sweetener compared to the sucrose equivalence of the non-mogroside based sweetener and the sucrose equivalence of the glycosylated mogroside-containing composition.

* * * * *